(12) United States Patent
Fukushima

(10) Patent No.: US 6,669,110 B2
(45) Date of Patent: Dec. 30, 2003

(54) WASHER SYSTEM HAVING SINGLE TANK FOR STORING CLEANING LIQUID

(75) Inventor: Tsuneo Fukushima, Kariya (JP)

(73) Assignee: Asmo Co., Ltd., Shizuoka (JP)

( * ) Notice: Subject to any disclaimer, the term of this patent is extended or adjusted under 35 U.S.C. 154(b) by 0 days.

(21) Appl. No.: 10/211,261

(22) Filed: Aug. 5, 2002

(65) Prior Publication Data

US 2003/0047621 A1 Mar. 13, 2003

(30) Foreign Application Priority Data

Aug. 24, 2001 (JP) ........................................ 2001-253884
Oct. 17, 2001 (JP) ........................................ 2001-318883

(51) Int. Cl.⁷ ............................................... B05B 1/10
(52) U.S. Cl. ................................. 239/284.2; 239/284.1
(58) Field of Search ........................... 239/284.1, 284.2

(56) References Cited

U.S. PATENT DOCUMENTS 3,423,025 A  * 1/1969 Rodger ................... 239/284.2
3,574,337 A  * 4/1971 Edwards et al. ......... 239/284.2
5,605,286 A  * 2/1997 Orth et al. ............... 239/284.2
5,657,929 A  * 8/1997 DeWitt et al. ........... 239/284.2

FOREIGN PATENT DOCUMENTS

| JP | U-4-95859 | 8/1992 |
| JP | A-10-194092 | 7/1998 |

* cited by examiner

Primary Examiner—Christopher S. Kim
(74) Attorney, Agent, or Firm—Posz & Bethards, PLC

(57) ABSTRACT

When a washer system for a vehicle is activated, a first pumping device and a second pumping device supply a first discharge nozzle and a second discharge nozzle with a cleaning liquid, respectively, so that the cleaning liquid is discharged toward a right headlamp and a left headlamp, respectively. Hence, it is possible to reduce the size (a reduction of capacity) of the first pumping device and the second pumping device. In addition, the first pumping device and the second pumping device can supply front nozzles and a rear nozzle with the cleaning liquid, respectively, and therefore, the overall washer system for a vehicle does not need any additional pumping device.

10 Claims, 6 Drawing Sheets

WASHER SYSTEM HAVING SINGLE TANK FOR STORING CLEANING LIQUID

CROSS REFERENCE TO RELATED APPLICATION

This application is based on and incorporates herein by reference Japanese Patent Application No. 2001-253884 filed on Aug. 24, 2001 and Japanese Patent Application No. 2001-318883 filed on Oct. 17, 2001.

BACKGROUND OF THE INVENTION

1. Field of the Invention

The present invention relates to a washer system of a vehicle, which discharges cleaning liquid to headlamps and front and rear window glasses of a vehicle to wash them.

2. Description of Related Art

A headlamp cleaner has been known to wash each corresponding headlamp of a vehicle when a corresponding switch is operated by a passenger (driver).

One of previously proposed headlamp cleaners includes a pair of discharge nozzles, a tank, and a single pumping apparatus. The discharge nozzles are arranged adjacent to left and right headlamps of the vehicle and discharge cleaning liquid to them. The tank is installed, for example, in an engine room and stores the cleaning liquid. The pumping apparatus is installed to the tank and is connected to each discharge nozzle through a corresponding hose or the like to supply the cleaning liquid to the discharge nozzle.

When the driver manipulates the corresponding switch and thus activates the pumping apparatus, the cleaning liquid pumped by the pumping apparatus is supplied to each corresponding discharge nozzle and is discharged toward the corresponding headlamp through each discharge nozzle. Since the headlamp cleaner can remove the dirt on the headlamps by only discharging the cleaning liquid, it does not require a wiper apparatus or the like, and therefore, has a simple structure.

Some types of previously proposed discharge nozzles are formed as an extendable discharge nozzle having a discharge opening at a distal end thereof. The extendable discharge nozzle is extended to a cleaning liquid discharge position for discharging the cleaning liquid to the corresponding headlamp only when the headlamp is washed. Generally, a piston/cylinder structure utilizing a hydraulic pressure of the cleaning liquid is used to form such an extendable discharge nozzle.

More specifically, for example, one end of a cylinder, which acts as a nozzle base, has a supply opening for supplying the cleaning liquid and is fixed to a vehicle body. An extendable nozzle serving as a nozzle discharge portion includes a piston portion and is provided with a cleaning liquid channel, which extends through the extendable nozzle. A segment of the extendable nozzle, which includes the piston portion, is placed inside the cylinder. Also, a coil spring serving as an urging means is provided in a space between the other end of the cylinder and the piston portion. Further, a discharge opening is made in the extendable nozzle at the end portion thereof that is positioned outside of the cylinder. A check valve is provided in the upstream of the discharge opening. The check valve allows communication between the cleaning liquid channel and the discharge opening only when a hydraulic pressure of the cleaning liquid exceeds a predetermined value.

The discharge nozzle having the above structure is placed in a retracted state when the piston portion of the extendable nozzle is urged by an urging force (or spring force) of the coil spring toward the one end of the cylinder. On the other hand, when the cleaning liquid pump is activated, and thus the hydraulic pressure of the cleaning liquid in a space between the one end of the cylinder and the piston portion rises, the piston portion is forced to move toward the other end of the cylinder by the hydraulic pressure against the urging force of the coil spring. Thus, the discharge nozzle is placed to an extended state (i.e., it has moved from the initial position to the cleaning liquid discharge position). When the hydraulic pressure of the cleaning liquid rises further in this state and exceeds the predetermined value, the check valve is opened, whereupon the cleaning liquid is discharged toward the headlamp from the discharge opening.

Furthermore, a washer apparatus associated with a wiper apparatus has been also known. This washer apparatus is operated when the driver manipulates a corresponding switch to wash a front window glass and a rear window glass of a vehicle.

Such a washer apparatus includes, for example, front and rear nozzles, a tank and one or more pumping apparatuses. The front and rear nozzles discharge the cleaning liquid toward the front glass and the rear glass, respectively. The tank is installed, for example, in the engine room and stores the cleaning liquid. Each pumping apparatus is installed to the tank and is connected to each corresponding nozzle through a hose or the like to supply the cleaning liquid to the corresponding nozzle.

With this arrangement, when the driver manipulates the corresponding switch for initiating supply of the cleaning liquid to the front nozzle and activates the corresponding pumping apparatus, the cleaning liquid pumped by the pumping apparatus is supplied to the front nozzle and is discharged toward the front glass through the front nozzle. On the other hand, when the driver manipulates the switch for initiating supply of the cleaning liquid to the rear nozzle and activates the corresponding pumping apparatus, the cleaning liquid pumped by the pumping apparatus is supplied to the rear nozzle and is discharged from the rear nozzle to the rear glass.

The cleaning liquid discharged over the front glass or the rear glass is wiped off together with the dirt by the wiper blades of the wiper apparatus. For this reason, the washer apparatus only has to wet the front glass or the rear glass with the cleaning liquid to suspend the dirt, and does not have to remove the dirt with a discharge of the cleaning liquid, thereby making it possible to use a compact pumping apparatus with a relatively low discharge pressure and a relatively low discharge rate.

With the previously proposed headlamp cleaner described above, however, the dirt on each headlamp is removed only by the discharge of the cleaning liquid as discussed above, and for this reason, the pumping apparatus needs to have a sufficiently high discharge pressure and a sufficiently high discharge rate of the cleaning liquid. Moreover, since the cleaning liquid supplied from the single pumping apparatus is discharged concurrently through the pair of discharge nozzles, the pumping apparatus needs to have a relatively high discharge pressure of the cleaning liquid and a relatively high discharge rate of the cleaning liquid, so that a relatively large pumping apparatus is required for the headlamp cleaner.

Particular, in the above arrangement, which includes the extendable discharge nozzle, the extendable discharge nozzle needs to be extended from the cylinder by a hydraulic pressure of the cleaning liquid against an urging force of the coil spring. As a result, a higher discharge pressure from the pumping apparatus is required, and thus a larger pumping apparatus is required.

Adopting such a larger pumping apparatus impairs the freedom of installation of the headlamp cleaner into the engine room where various kinds of components are tightly placed (due to a limited installation space) and causes an increase in cost because of its lower versatility.

Also, it is conceivable to integrate the tank of the window washer apparatus and the tank of the headlamp cleaner into a single tank. In such a case, the single tank needs to have a relatively large volume for storing the cleaning liquid. When the pumping apparatus of the window washer apparatus and the pumping apparatus of the headlamp cleaner need to be secured to the single tank, it is difficult to achieve the relatively large volume of the tank because of the space limitations.

SUMMARY OF THE INVENTION

The present invention addresses the above disadvantages. Thus, it is an objective of the present invention to provide a washer system for a vehicle capable of supplying a first discharge nozzle and a second discharge nozzle, which are provided to a vehicle on the right and left to correspond to the headlamps mounted on the right and left of the vehicle, with cleaning liquid at a sufficiently high discharge pressure and a sufficiently high discharge rate by using a compact pumping apparatus.

To achieve the objective of the present invention, there is provided a washer system including a tank, a first discharge nozzle, a second discharge nozzle, a front nozzle and a pumping apparatus. The tank stores cleaning liquid. The first discharge nozzle receives the cleaning liquid from the tank and discharges the cleaning liquid to a right headlamp of a vehicle. The second discharge nozzle receives the cleaning liquid from the tank and discharges the cleaning liquid to a left headlamp of the vehicle. The front nozzle receives the cleaning liquid from the tank and discharges the cleaning liquid to a front glass of the vehicle. The pumping apparatus is connected to the tank, the first discharge nozzle, the second discharge nozzle and the front nozzle and pumps the cleaning liquid of the tank to the first discharge nozzle, the second discharge nozzle and the front nozzle. The pumping apparatus includes a first pumping device and a second pumping device. The first pumping device includes two outlet openings and selectively discharges the cleaning liquid through a corresponding one of the two outlet openings that is selected depending on an operational state of the first pumping device. One of the two outlet openings of the first pumping device is connected to one of the first and second discharge nozzles to supply the cleaning liquid to the one of the first and second discharge nozzles, and the other one of the two outlet openings of the first pumping device is connected to the front nozzle to supply the cleaning liquid to the front nozzle. The second pumping device includes at least one outlet opening for discharging the cleaning liquid from the second pumping device. One of the at least one outlet opening is connected to the other one of the first and second discharge nozzles to supply the cleaning liquid to the other one of the first and second discharge nozzles.

To achieve the objective of the present invention, there is provided a washer system including a tank, a first discharge nozzle, a second discharge nozzle, a front nozzle and a pumping apparatus. The tank stores cleaning liquid. The first discharge nozzle receives the cleaning liquid from the tank and discharges the cleaning liquid to a right headlamp of a vehicle. The second discharge nozzle receives the cleaning liquid from the tank and discharges the cleaning liquid to a left headlamp of the vehicle. The front nozzle receives the cleaning liquid from the tank and discharges the cleaning liquid to a front glass of the vehicle. The pumping apparatus is connected to the tank, the first discharge nozzle, the second discharge nozzle and the front nozzle and pumps the cleaning liquid of the tank to the first discharge nozzle, the second discharge nozzle and the front nozzle. Each of the first and second discharge nozzles includes a nozzle base, which is secured to the vehicle, a nozzle discharge portion, which discharges the cleaning liquid to the corresponding one of the right and left headlamps and is slidable relative to the nozzle base between a retracted position and a discharge position, and an urging means for urging the nozzle discharge portion toward the retracted position. The nozzle discharge portion is moved relative to the nozzle base from the retracted position to the discharge position by a fluid pressure of the cleaning liquid supplied from the pumping apparatus to a cleaning liquid chamber defined between the nozzle base and the nozzle discharge portion. The nozzle discharge portion discharges the cleaning liquid, which is supplied to the nozzle discharge portion independently of the cleaning liquid chamber, to the corresponding one of the right and left headlamps. The pumping apparatus includes a first pumping device and a second pumping device. The first pumping device includes two outlet openings and selectively discharges the cleaning liquid through a corresponding one of the two outlet openings that is selected depending on an operational state of the first pumping device. One of the two outlet openings of the first pumping device is connected to one of the cleaning liquid chamber and the nozzle discharge portion of each of the first and second discharge nozzles to supply the cleaning liquid to the one of the cleaning liquid chamber and the nozzle discharge portion of each of the first and second discharge nozzles. The other one of the two outlet openings of the first pumping device is connected to the front nozzle to supply the cleaning liquid to the front nozzle. The second pumping device includes at least one outlet opening for discharging the cleaning liquid from the second pumping device. One of the at least one outlet opening is connected to the other one of the cleaning liquid chamber and the nozzle discharge portion of each of the first and second discharge nozzles to supply the cleaning liquid to the other one of the cleaning liquid chamber and the nozzle discharge portion of each of the first and second discharge nozzles.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

A washer system 10 for a vehicle according to a first embodiment of the present invention will be described with reference to FIGS. 1–3B.

Figure 1:
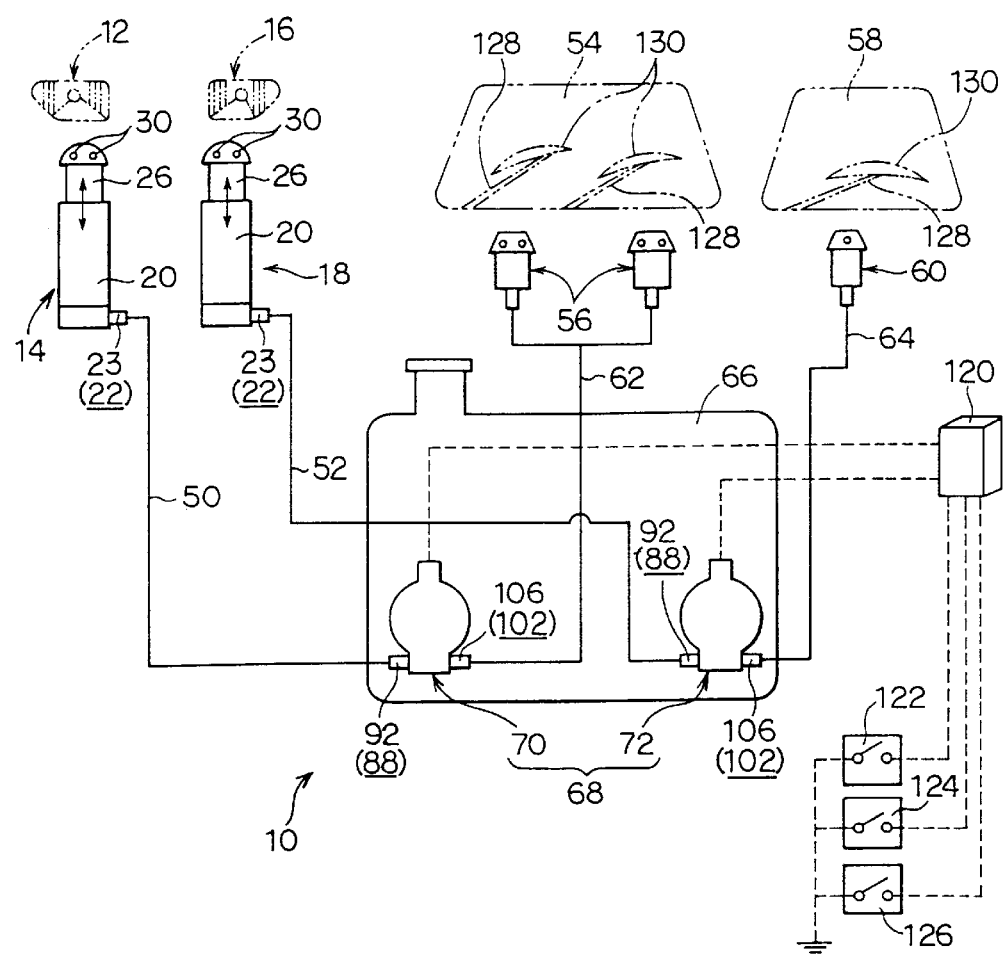
FIG. 1 is a schematic view showing an arrangement of a washer system for a vehicle according to a first embodiment of the present invention.

With reference to FIG. 1, the washer system 10 includes a first discharge nozzle 14 provided to correspond to a right headlamp 12 of the vehicle, and a second discharge nozzle 18 provided to correspond to a left headlamp 16 of the vehicle.

Figure 2:
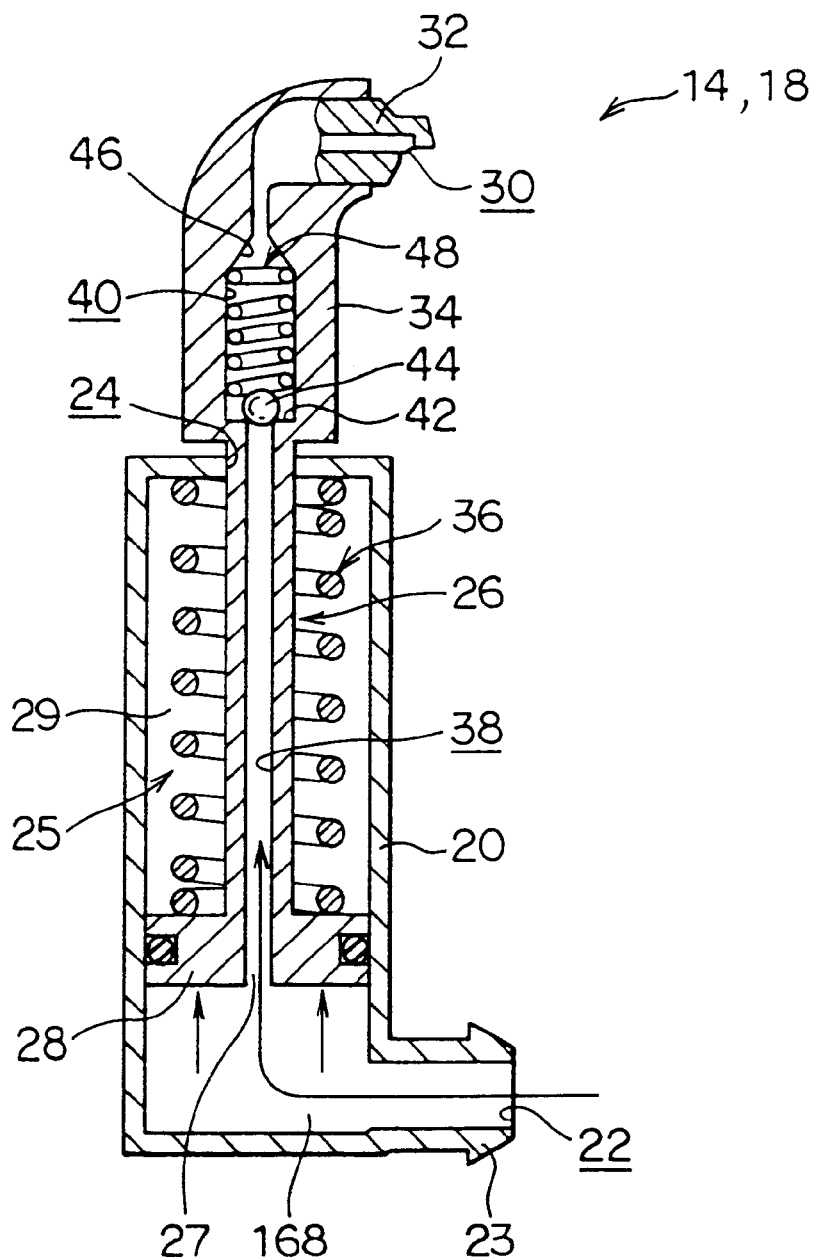
FIG. 2 is a schematic cross-sectional view showing an arrangement of first and second discharge nozzles of the washer system according to the first embodiment.

Each of the first discharge nozzle 14 and the second discharge nozzle 18 is a so-called telescopic type (piston and cylinder type) extendable discharge nozzle. More specifically, as shown in FIG. 2, each of the first discharge nozzle 14 and the second discharge nozzle 18 includes a cylinder 20 serving as a nozzle base fixed to the vehicle. The cylinder 20 is of a substantially cylindrical shape and defines an internal chamber 25 therein. A receiving opening 24 extends through a top wall of the cylinder 20 and is communicated with one end of the internal chamber 25. Furthermore, a supply opening 22 is formed at a lower end of the cylinder 20 and is communicated with the other end of the internal chamber 25 to supply the cleaning liquid into the internal chamber 25. A pipe wall, which surrounds the supply opening 22, forms a hose joint portion 23.

A part of an extendable nozzle 26, which serves as a nozzle discharge portion, is received in the internal chamber 25 of the cylinder 20. The extendable nozzle 26 is of a cylindrical shape having a sufficiently small outer diameter in comparison with an inner diameter of the cylinder 20. The nozzle 26 includes a piston portion 28, which is slidably received in the internal chamber 25 of the cylinder 20, at one end. In the internal chamber 25 of the cylinder 20, the piston portion 28 defines a cleaning liquid chamber 168 on one side (lower side in FIG. 2) of the piston portion 28 and a spring chamber 29 on the other side (upper side in FIG. 2) of the piston portion 28. The cleaning liquid chamber 168 is substantially fluid-tightly separated from the spring chamber 29 by the piston portion 28. The cleaning liquid chamber 168 is communicated with the supply opening 22 to receive the cleaning liquid through the supply opening 22. The nozzle 26 also includes a discharge portion 34, into which a nozzle tip 32 having discharge openings 30 is inserted, at the other end.

An intermediate portion of the extendable nozzle 26 is slidably received through the receiving opening 24 while the piston portion 28 is slidably received in the internal chamber 25 of the cylinder 20, and the discharge portion 34 is placed outside of the cylinder 20. Also, a coil spring (piston spring) 36 serving as an urging means is provided in the spring chamber 29, which is defined between an inner end wall surface of the cylinder 20 located around the receiving opening 24 and the piston portion 28. The coil spring 36 urges the extendable nozzle 26 toward its retracted position where the nozzle 26 is retracted into the cylinder 20.

An inlet opening 27 is formed in the piston portion 28 of the nozzle 26 and opens to the cleaning liquid chamber 168.

Furthermore, a cleaning liquid channel 38 is formed in the extendable nozzle 26 to communicate between the inlet opening 27 and the discharge openings 30 in the nozzle 26. A valve chamber 40 is arranged in the cleaning liquid channel 38 within the discharge portion 34.

The valve chamber 40 receives a ball valve 44. Furthermore, a valve seat 42 is formed in the valve chamber 40 of the cleaning liquid channel 38 by constructing a corresponding bottom portion of the valve chamber 40 into a step-like form. The ball valve 44 is capable of moving in an axial direction and normally seats against the valve seat 42 to close the cleaning liquid channel 38. In the valve chamber 40, the ball valve 44 is engaged with one end of a coil spring (valve spring) 48 that is held in engagement with a conical portion 46 provided at the top end of the valve chamber 40, which is opposite to the valve seat 42. Thus, the ball valve 44 is urged against the valve seat 42 by the coil spring 48. An urging force of the spring 48 is selected such that the ball valve 44 is seated against the valve seat 42 by the urging force of the spring 48 until the nozzle discharge portion 26 reaches the discharge position, at which the ball valve 44 is lifted away from the valve seat 42 by a fluid pressure of the cleaning liquid in the cleaning liquid channel 38 to allow discharge of the cleaning liquid through the discharge openings 30.

The hose joint portion 23 of the first discharge nozzle 14 is connected to a first pumping device 70 (described later) through a hose (or pipe) 50, which is capable of delivering the cleaning liquid, and the hose joint portion 23 of the second discharge nozzle 18 is connected to a second pumping device 72 (described later) through a hose (or pipe) 52, which is also capable of delivering the cleaning liquid. When the cleaning liquid is supplied into the cleaning liquid chamber 168 of the cylinder 20 in each discharge nozzle 14, 18 through the supply opening 22, the extendable nozzle 26 is extended with respect to the cylinder 20 by a hydraulic pressure of the cleaning liquid in the cleaning liquid chamber 168 against an urging force (or spring force) of the coil spring 36. When the hydraulic pressure inside the cleaning liquid chamber 168 of the cylinder 20 rises further, the ball valve 44 is forced and is lifted away from the valve seat 42 by the hydraulic pressure of the cleaning liquid against an urging force (or spring force) of the coil spring 48.

Consequently, each extendable nozzle 26, which is generally positioned, for example, inside a bumper of the vehicle, is extended from the initial position (retracted position) to a cleaning liquid discharge position where the cleaning liquid is discharged from the nozzle 26 through the corresponding discharge openings 30 to the corresponding headlamp 12, 16.

The washer system 10 further includes a pair of front nozzles 56 and a rear nozzle 60. The front nozzles 56 are fixedly provided to the vehicle for discharging the cleaning liquid toward the front windshield (hereinafter, referred to as the front glass) 54 of the vehicle. The rear nozzle 60 is fixedly provided to the vehicle for discharging the cleaning liquid toward the rear windshield (hereinafter, referred to as the rear glass) 58 of the vehicle.

The front nozzles 56 are connected to the first pumping device 70 through a hose (or pipe) 62, which is capable of delivering the cleaning liquid. The rear nozzle 60 is connected to the second pumping device 72 described below through a hose (or pipe) 64, which is capable of delivering the cleaning liquid. Upon supply of the cleaning liquid, the front nozzles 56 and the rear nozzle 60 respectively discharge the cleaning liquid toward the front glass 54 and the rear glass 58 at their fixed positions on the vehicle.

The washer system 10 also includes a tank 66, which is installed, for example, in the engine room of the vehicle to store the cleaning liquid, and a pumping apparatus 68, which is secured to the tank 66. The pumping apparatus 68 includes the first pumping device 70 and the second pumping device 72. The first pumping device 70 and the second pumping device 72 will be described in greater detail below.

Figure 3A:
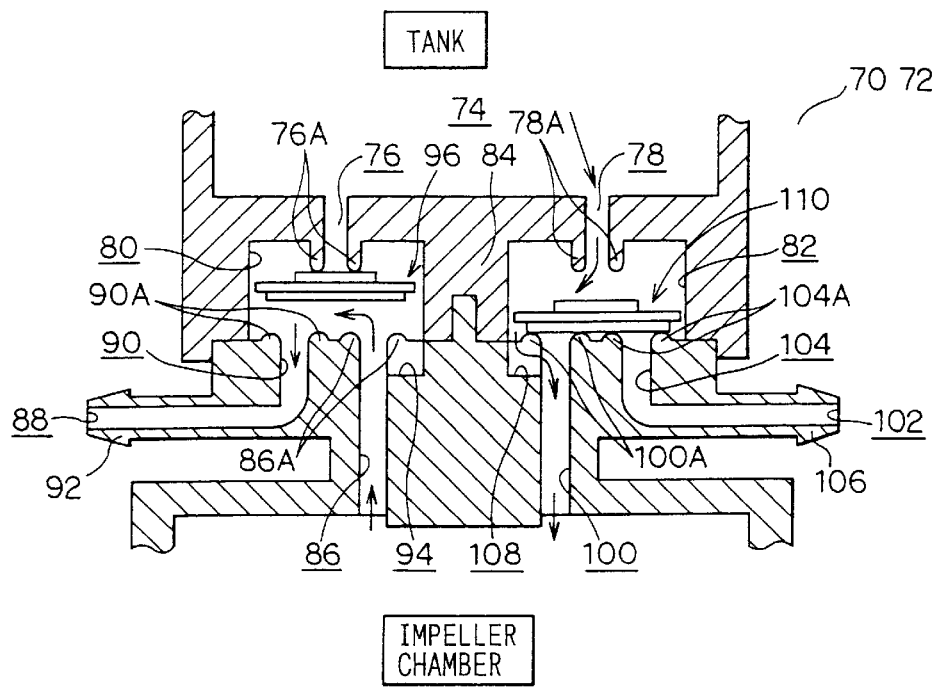
FIG. 3A is a partial cross-sectional view of a pumping device of the washer system according to the first embodiment showing a cleaning liquid channel switching arrangement of the pumping device.

With reference to FIG. 3A, each of the first pumping device 70 and the second pumping device 72 has an intake opening 74, which is connected to the tank 66 near the bottom portion of the tank 66. A first valve chamber 80 and a second valve chamber 82 communicating with the intake opening 74 through communication holes 76 and 78, respectively, are formed below the intake opening 74 (on an impeller chamber 114 side described below). The first valve chamber 80 and the second valve chamber 82 are separated from each other by a partition wall 84.

Also, a communication channel 86 and a discharge communication channel 90 are formed below the first valve chamber 80. The communication channel 86 is communicated with the impeller chamber 114 described below. The discharge communication channel 90 is communicated with a first outlet opening 88. The pipe wall surrounding the first outlet opening 88 forms a hose joint portion 92.

Further, valve seats 76A, 86A, 90A are formed inside the first valve chamber 80 to protrude inwardly at the peripheries of the opening ends of the communication hole 76, the communication channel 86, and the discharge communication channel 90 on the first valve chamber 80 side, respectively. Also, a bypassing notch portion (or recessed portion) 94 is formed in close proximity to the opening end of the communication channel 86 on the first valve chamber 80 side of the communication channel 86.

A first valve 96 is generally freely movably received in the first valve chamber 80. Due to a pressure difference exerted on the first valve 96, the first valve 96 can be moved in a vertical direction between a position for blocking the communication hole 76 (for blocking communication between the intake opening 74 and the first valve chamber 80) and a position for blocking the discharge communication channel 90 (for blocking communication between the first valve chamber 80 and the first outlet opening 88). Specifically, the first valve 96 blocks the communication hole 76 when the first valve 96 is engaged with the valve seat 76A. The first valve 96 blocks the discharge communication channel 90 when the first valve 96 is engaged with the valve seat 86A and the valve seat 90A.

While the first valve 96 is pressed against the valve seat 86A and the valve seat 90A, the notch portion 94 maintains the communication between the first valve chamber 80 and the communication channel 86 (that is, the impeller chamber 114).

A communication channel 100 and a discharge communication channel 104 are formed below the second valve chamber 82. The communication channel 100 is communicated with the impeller chamber 114 independently of the communication channel 86. The discharge communication channel 104 is communicated with a second outlet opening 102. The pipe wall surrounding the second outlet opening 102 forms a hose joint portion 106.

Further, valve seats 78A, 100A, 104A are formed inside the second valve chamber 82 to protrude inwardly at the peripheries of the opening ends of the communication hole 78, the communication channel 100, and the discharge communication channel 104 on the second valve chamber 82 side, respectively. In addition, a bypassing notch portion 108 is formed in close proximity to the opening end of the communication channel 100 on the second valve chamber 82 side.

A second valve 110 is generally freely movably received in the second valve chamber 82. Due to a pressure difference exerted on the second valve 110, the second valve 110 can be moved in a vertical direction between a position for blocking the communication hole 78 (for blocking communication between the intake opening 74 and the second valve chamber 82) and a position for blocking the discharge communication channel 104 (for blocking communication between the second valve chamber 82 and the second outlet opening 102). Specifically, the second valve 110 blocks the communication hole 78 when the second valve 82 is engaged with the valve seat 78A. The second valve 110 blocks the discharge communication channel 104 when the second valve 110 is engaged with the valve seat 100A and the valve seat 104A.

As shown in FIG. 3A, even when the second valve 110 is pressed against the valve seat 100A and the valve seat 104A by the pressure difference, the notch portion 108 maintains communication between the second valve chamber 82 and the communication channel 100 (that is, the impeller chamber 114).

The communication holes 76, 78, the first valve chamber 80, the second valve chamber 82, the communication channels 86, 100, the discharge communication channels 90, 104, the notch portions 94, 108, the first valve 96, the second valve 110, the impeller chamber 114 and the valve seats 76A, 78A, 86A, 90A, 100A, 104A correspond to a valve apparatus of the present invention.

Figure 3B:
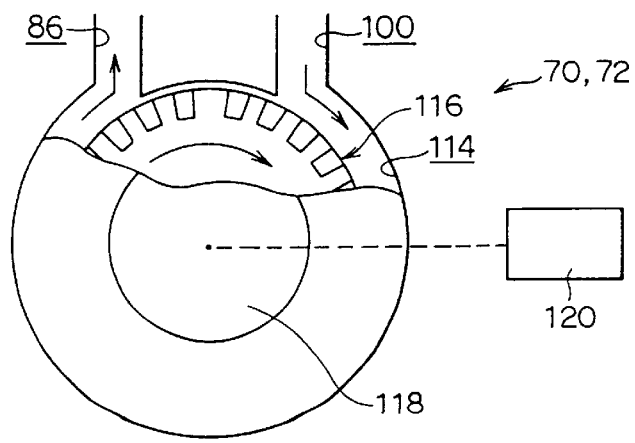
FIG. 3B is a partial cutaway plan view of the pumping device of the washer system according to the first embodiment showing an impeller chamber of the pumping device.

As shown in FIG. 3B, each of the first pumping device 70 and the second pumping device 72 includes the impeller chamber 114 of a substantially circular shape when viewed in a plane. As has been descried above, the impeller chamber 114 communicates with the communication channels 86, 100, independently.

The impeller chamber 114 receives an impeller 116, which is mounted coaxially and rotatably with respect to the impeller chamber 114. The rotatable shaft or drive shaft (not shown) of an electric motor 118, which can rotate both in normal (rotations in a clockwise direction of FIG. 3B) and reverse directions, is securely connected to the impeller 116. Thus, the impeller 116 is driven to rotate when the electric motor 118 is activated. The impeller 116 is formed such that the impeller 116 can pressurize (pump up) the cleaning liquid when the electric motor 118 rotates in either the normal or reverse direction.

The communication channels 86 and 100 communicate with the impeller chamber 114 in such a manner that when the impeller 116 is rotated in the normal direction, the cleaning liquid is pressurized while being sucked from the communication channel 100 and pumped out through the communication channel 86, and when the impeller 116 is rotated in the reverse direction, the cleaning liquid is pressurized while being sucked from the communication channel 86 and pumped out through the communication channel 100.

Consequently, in each of the first pumping device 70 and the second pumping device 72, when the impeller 116 is rotated in the normal direction, the first valve 96 is forced to move upward and pressed against the valve seat 76A by a pressure difference, which is developed between the upper and lower sides isolated by the first valve 96 due to a fluid pressure of the cleaning liquid being pumped. As a result, the intake opening 74 is communicated with the first outlet opening 88 through the communication hole 78, the second valve chamber 82, the notch portion 108, the communication channel 100, the impeller chamber 114, the communication channel 86, the first valve chamber 80, and the discharge communication channel 90 (as indicated by arrows in FIG. 3A), while the second valve 110 substantially restrains communication between the intake opening 74 and the second outlet opening 102.

On the other hand, when the impeller 116 is rotated in the reverse direction, the second valve 110 is forced to move upward and pressed against the valve seat 78A by a pressure difference, which is developed between the upper and lower sides isolated by the second valve 110 due to a fluid pressure of the cleaning liquid being pumped. As a result, the intake opening 74 is communicated with the second outlet opening 102 through the communication hole 76, the first valve chamber 80, the notch portion 94, the communication chamber 86, the impeller chamber 114, the communication channel 100, the second valve chamber 82 and the discharge communication channel 104, while the first valve 96 substantially restrains communication between the intake opening 74 and the first outlet opening 88.

In other words, each of the first pumping device 70 and the second pumping device 72 is arranged so as to selectively switch an outlet opening for discharging the cleaning liquid between the first outlet opening 88 and the second outlet opening 102 depending on the rotational direction of the impeller 116 (i.e., depending on the operational state of the pumping device 70, 72).

The hose joint portion 92, which forms the first outlet opening 88 of the first pumping device 70, is connected to one end of the hose 50 that is connected to the hose joint portion 23 of the first discharge nozzle 14 at the other end. The hose joint portion 106, which forms the second outlet opening 102 of the first pumping device 70, is connected to one end of the hose 62 that is connected to both the front nozzles 56 at the other end. Furthermore, the hose joint portion 92, which forms the first outlet opening 88 of the second pumping device 72, is connected to one end of the hose 52 that is connected to the hose joint portion 23 of the second discharge nozzle 18 at the other end. The hose joint portion 106, which forms the second outlet opening 102 of the second pumping device 72 is connected to one end of the hose 64 that is connected to the rear nozzle 60 at the other end.

In other words, the first pumping device 70 is constructed in the following manner. That is, when the impeller 116 is rotated in the normal direction, the cleaning liquid is supplied to the first discharge nozzle 14 from the first outlet opening 88 and is discharged from the first discharge nozzle 14 toward the right headlamp 12. Then, when the impeller 116 is rotated in the reverse direction, the cleaning liquid is supplied to the front nozzles 56 from the second outlet opening 102 and is discharged from the front nozzles 56 toward the front glass 54. The second pumping device 72 is arranged in the following manner. That is, when the impeller 116 is rotated in the normal direction, the cleaning liquid is supplied to the second discharge nozzle 18 from the first outlet opening 88 and is discharged from the second discharge nozzle 18 toward the left headlamp 16. Then, when the impeller 116 is rotated in the reverse direction, the cleaning liquid is supplied to the rear nozzle 60 from the second outlet opening 102 and is discharged from the rear nozzle 60 toward the rear glass 58.

Also, the electric motor 118 in each of the first pumping device 70 and the second pumping device 72 is electrically connected to a controller 120, which serves as a discharge control apparatus. The electric motor 118 is arranged so that it stops and rotates in the normal or reverse direction based on an output from the controller 120. As shown in FIG. 1, the controller 120 is electrically connected to a control switch device (or simply referred to the control switch), which includes a headlamp washing switch 122, a front glass washing switch 124, and a rear glass washing switch 126, all of which can be manipulated near the driver's seat of the vehicle.

When the headlamp washing switch 122 is switched on (i.e., selecting a headlamp washing mode), the controller 120 rotates the electric motor 118 in each of the first pumping device 70 and the second pumping device 72 in the normal direction for a predetermined time either continuously or intermittently. When the front glass washing switch 124 is switched on (i.e., selecting a front glass washing mode), the controller 120 rotates the electric motor 118 in the first pumping device 70 alone in the reverse direction while the ON state of the front glass washing switch 124 is maintained. When the rear glass washing switch 126 is switched on (i.e., selecting a rear glass washing mode), the controller 120 rotates the electric motor 118 in the second pumping device 72 alone in the reverse direction while the ON state of the rear glass washing switch 126 is maintained.

Also, the controller 120 is operated synchronously with a front wiper apparatus and a rear wiper apparatus. Thus, when the front glass washing switch 124 is switched on, the controller 120 activates the front wiper apparatus for a predetermined time period (i.e., the corresponding wiper makes a predetermined number of swings). When the rear glass washing switch 126 is switched on, the controller 120 activates the rear wiper apparatus for a predetermined time period (i.e., the corresponding wiper makes a predetermined number of swings). Hence, according to this arrangement, a wiper blade 130, which is connected to a distal end of each wiper arm 128 of the front wiper apparatus, wipes the cleaning liquid discharged over the front glass 54 together with the dirt when the front glass washing switch 124 is switched on. Furthermore, a wiper blade 130, which is connected to a distal end of a wiper arm 128 of the rear wiper apparatus, wipes the cleaning liquid discharged over the rear glass 58 together with the dirt when the rear glass washing switch 126 is switched on.

Next, the operation of the first embodiment will be described.

In the washer system 10 constructed in the above manner, when the driver switches on the front glass washing switch 124 near the driver's seat, the controller 120 drives the electric motor 118 in the first pumping device 70 in the reverse direction, so that the impeller 116 starts to rotate in the reverse direction. Then, the cleaning liquid drawn into the impeller chamber 114 from the tank 66 through the intake opening 74 is pressurized by the impeller 116 and discharged (pumped out) from the second outlet opening 102.

In this case, the cleaning liquid is guided (delivered) through the hose 62 and is then supplied to the front nozzles 56. Thereafter, the cleaning liquid is discharged from each front nozzle 56 toward the front glass 54. The cleaning liquid is kept discharged while the driver keeps the front glass washing switch 124 switched on (while the ON state of the front glass washing switch 124 is maintained).

At this time, the controller 120 activates the front wiper apparatus for a predetermined time period (i.e., the corresponding wiper makes a predetermined number of swings), so that the wiper blades 130 wipe the front glass 54 as the wiper arms 128 swing. Consequently, the dirt stuck to the front glass 54 is removed together with the cleaning liquid. In short, the front glass 54 is washed.

Also, when the driver switches on the rear glass washing switch 126 near the driver's seat, the controller 120 drives the electric motor 118 in the second pumping device 72 to rotate in the reverse direction, whereby the impeller 116 starts to rotate in the reverse direction. Then, the cleaning liquid drawn into the impeller chamber 114 from the tank 66 through the intake opening 74 is pressurized by the impeller 116 and discharged (pumped out) from the second outlet opening 102.

In this case, the cleaning liquid is guided through the hose 64 and is then supplied to the rear nozzle 60. Thereafter, the cleaning liquid is discharged from the rear nozzle 60 toward the rear glass 58. The cleaning liquid is kept discharged while the driver keeps the rear glass washing switch 126 switched on (while the ON state of the rear glass washing switch 126 is maintained).

At this time, the controller 120 activates the rear wiper apparatus for a predetermined time period (i.e., the corresponding wiper makes a predetermined number of swings), whereby the wiper blade 130 wipes the rear glass 58 as the wiper arm 128 swings. Consequently, the dirt stuck to the rear glass 58 is removed together with the cleaning liquid. In short, the rear glass 58 is washed.

Further, when the driver switches on the headlamp washing switch 122 near the driver's seat, the controller 120 drives the electric motor 118 in each of the first pumping device 70 and the second pumping device 72 to rotate in the normal direction, whereby the impeller 116 in each pumping device starts to rotate in the normal direction. Then, in each pumping device 70, 72, the cleaning liquid drawn into the impeller chamber 114 from the tank 66 through the intake opening 74 is pressurized by the impeller 116 and is discharged (pumped out) from the first outlet opening 88.

In this case, the cleaning liquid discharged from the first outlet opening 88 of the first pumping device 70 is guided through the hose 50 and is supplied into the cleaning liquid chamber 168 of the cylinder 20 of the first discharge nozzle 14 through the supply opening 22 of the first discharge nozzle 14. Similarly, the cleaning liquid discharged from the first outlet opening 88 of the second pumping device 72 is guided through the hose 52 and is supplied into the cleaning liquid chamber 168 of the cylinder 20 of the second discharge nozzle 18 through the supply opening 22 of the second discharge nozzle 18.

In each of the first discharge nozzle 14 and the second discharge nozzle 18, the piston portion 28 is forced to slide against the urging force of the coil spring 36 by the hydraulic pressure of the cleaning liquid supplied into the cleaning liquid chamber 168 of the cylinder 20, so that the extendable nozzle 26 is extended from the cylinder 20. When the discharge openings 30 located at the distal end of each extendable nozzle 26 is moved from the initial position to the discharge position, a stopper means (not shown) prevents any further extension of the extendable nozzle 26 from the cylinder 20.

When the hydraulic pressure of the cleaning liquid in the cleaning liquid chamber 168 rises further as the first pumping device 70 and the second pumping device 72 continue to operate in this state, the ball valve 44 is forced and is lifted away from the valve seat 42 by the hydraulic pressure against the urging force of the coil spring 48. Then, the cleaning liquid channel 38, which is opened at the inlet opening 27 in the end of the piston portion 28, is communicated with the discharge openings 30, so that the cleaning liquid is discharged from the discharge openings 30.

More specifically, the cleaning liquid is discharged toward the right headlamp 12 from the discharge openings 30 of the first discharge nozzle 14, and the cleaning liquid is discharged toward the left headlamp 16 from the discharge openings 30 of the second discharge nozzle 18. The cleaning liquid is discharged from the both discharge openings 30 concurrently only for a predetermined time period (for example, for 10 seconds after the time point, at which the headlamp washing switch 122 is switched on) regardless of how long the driver manipulates the headlamp washing switch 122. Also, the cleaning liquid is discharged either continuously or intermittently (interruptedly) within the predetermined time period.

Consequently, the dirt stuck to each of the right and left headlamps 12, 16 is suspended (peeled or isolated) in the cleaning liquid thus discharged and is then removed by the cleaning liquid discharged subsequently. In short, the right and left headlamps 12 and 16 are washed.

When the predetermined time period elapses, the controller 120 deactivates the first pumping device 70 and the second pumping device 72, so that the extendable nozzle 26 in each of the first discharge nozzle 14 and the second discharge nozzle 18 is retracted into the cylinder 20 and is thus returned to its initial position by the urging force of the corresponding coil spring 36 while returning the cleaning liquid remaining within the cylinder 20 to the tank 66 by way of the pumping apparatus 68.

As described above, the cleaning liquid is supplied to the first discharge nozzle 14 from the first pumping device 70, and the cleaning liquid is supplied to the second discharge nozzle 18 from the second pumping device 72. That is, only one pumping device (the first pumping device 70 or the second pumping device 72) is used to supply the cleaning liquid to each discharge nozzle (first discharge nozzle 14 or the second discharge nozzle 18). Thus, a discharge rate of the cleaning liquid from each pumping device can be reduced. Hence, the cleaning liquid can be supplied to each of the first and second discharge nozzles 14, 18 at a sufficiently high discharge pressure and also at a sufficiently high discharge rate by each corresponding one of the compact first and second pumping devices 70, 72, respectively.

Also, the first pumping device 70 supplies the cleaning liquid to the front nozzles 56 through the second outlet opening 102, which is one of the two outlet openings for selectively discharging the cleaning liquid from the first pumping device 70. In other words, a size (or discharge rate) of the first pumping device 70 is reduced, and the first pumping device 70 is shared between the front nozzles 56 and the first discharge nozzle 14. Thus, the overall size of the washer system 10 is not substantially increased.

As described above, in the washer system 10 according to the first embodiment, the cleaning liquid can be supplied from the compact pumping apparatus 68 (each of the compact first and second pumping devices 70, 72) at the sufficient discharge pressure and also at the sufficient discharge rate to each of the first and second discharge nozzles 14, 18 provided to the right and left headlamps 12, 16, respectively.

Particularly, since the extendable nozzle 26 needs to be extended from the cylinder 20 against the urging force of the coil spring 36 before the cleaning liquid is discharged from the discharge nozzle 14, 18 (also, since the valve lifting pressure or discharge pressure of the cleaning liquid for lifting the ball valve 44 from the valve seat 42 against the coil spring 48 needs to be relatively high to prevent discharge of the cleaning liquid from the discharge nozzle 14, 18 before accomplishing the full extension of the extendable nozzle 26), the discharge pressure of each of the first pumping device 70 and the second pumping device 72, which supply the cleaning liquid to the first discharge nozzle 14 and the second discharge nozzle 18, respectively, needs to be increased. However, since one pumping device 70, 72 is used for each discharge nozzle 14, 18, the cleaning liquid can be supplied from the compact pumping apparatus 68 (first pumping device 70 and second pumping device 72) to the first discharge nozzle 14 and the second discharge nozzle 18 at the sufficiently high discharge pressure and also at the sufficiently high discharge rate.

Also, each of the first discharge nozzle 14 and the second discharge nozzle 18 includes the ball valve 44 to achieve the full extension of the extendable nozzle 26 before the discharge of the cleaning liquid from discharge nozzle 14, 18, and thus the cleaning liquid remains up to the very upstream of the ball valve 44 even when the pumping apparatus 68 is not operated. Thus, as soon as the headlamp washing switch 122 is switched on, the extendable nozzle 26 is extended promptly and starts to discharge the cleaning liquid. Furthermore, undesirable leakage (effluent) of the remaining cleaning liquid from the discharge openings 30 can be prevented by the ball valve 44.

Also, the second pumping device 72 supplies the cleaning liquid to the rear nozzle 60 through the second outlet opening 102, which is one of the two outlet openings for selectively discharging the cleaning liquid. In other words, the second pumping device 72 is made compact, so that the second pumping device 72 can be shared between the rear nozzle 60 and the second discharge nozzle 18. Thus, it possible to achieve the washing capability for washing the rear glass 58 at the relatively low costs without increasing the number of the pumping devices in the pumping apparatus 68.

Further, each of the first pumping device 70 and the second pumping device 72 is provided with the function for selectively switching the outlet openings (first outlet opening 88 and second outlet opening 102) for discharging the cleaning liquid, that is, the destinations of cleaning liquid being supplied, depending on the rotational direction of the impeller 116. Hence, it is possible to switch the direction of discharge (destination of the cleaning liquid being supplied) by merely changing the direction of rotation of the electric motor 118 that drives the impeller 116 without requiring an extra connection between the pumping apparatus 68 and each spray nozzle (i.e., each of the first spray nozzle 14, the second spray nozzle 18, the front nozzles 56 and rear nozzle 60).

Consequently, there is the greater freedom in installation of the washer system 10 in vehicles, and the number of the components can be advantageously reduced. Furthermore, since no extra connection is required, an increase in the pressure loss between the pumping apparatus 68 and each discharge nozzle (i.e., each of the first discharge nozzle 14, the second discharge nozzle 18, the front nozzles 56 and the rear nozzle 60) is advantageously avoided, and the size (discharge pressure) of the pumping apparatus 68 can be further reduced.

In the first embodiment, the first outlet opening 88 of the first pumping device 70 is connected to the first discharge nozzle 14 to supply the cleaning liquid to the first discharge nozzle 14, and the first outlet opening 88 of the second pumping device 72 is connected to the second discharge nozzle 18 to supply the cleaning liquid to the second discharge nozzle 18. It should be appreciated, however, that the present invention is not limited to the foregoing arrangement, and each of the first pumping device 70 and the second pumping device 72 only has to be connected to either of the first discharge nozzle 14 and the second discharge nozzle 18 to supply the cleaning liquid thereto. Thus, for example, the second outlet opening 102 of the second pumping device 72 may be connected to the first discharge nozzle 14, and the first outlet opening 88 of the first pumping device 70 may be connected to the second discharge nozzle 18.

Also, in the first embodiment, each of the first discharge nozzle 14 and the second discharge nozzle 18 is constructed as the extendable discharge nozzle that can be extended by the hydraulic pressure of the cleaning liquid. It should be appreciated, however, that the present invention is not limited to the foregoing arrangement, and each of the first discharge nozzle 14 and the second discharge nozzle 18 may be constructed as a discharge nozzle provided fixedly or stationarily to the bumper of the vehicle or the like at the discharge positions, or may be constructed in such a manner that the nozzle discharge portion (the extendable nozzle 26) is extendable from the corresponding nozzle base (the cylinder 20) by any other driving force (for example, electric power or a pressure of compressed air).

Next, a washer system 140 for a vehicle according to a second embodiment of the present invention will be described with reference to FIGS. 4 and 5. Hereinafter, like components are labeled with like reference numerals with respect to the first embodiment, and these components are not further described.

Figure 4:
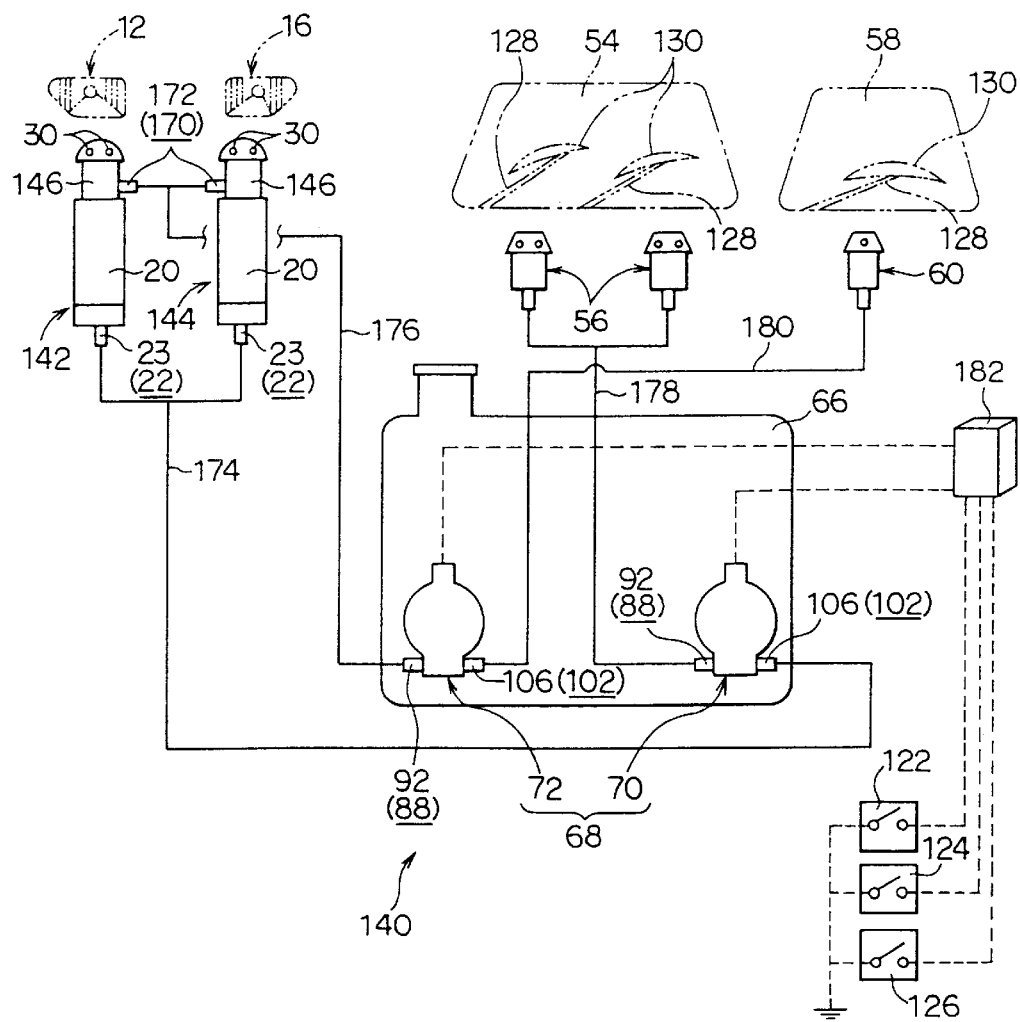
FIG. 4 is a schematic view showing an arrangement of a washer system for a vehicle according to a second embodiment of the present invention.

As shown in FIG. 4, the washer system 140 differs from the washer system 10 of the first embodiment in that the first discharge nozzle 14 and the second discharge nozzle 18 are replaced with a first discharge nozzle 142 and a second discharge nozzle 144, respectively.

Also, the washer system 140 differs from the washer system 10 in that the destinations of the cleaning liquid being supplied by the pumping apparatus 68 are changed. These differences will be described below. In FIG. 4, the first pumping device 70 and the second pumping device 72 are reversed with respect to those of FIG. 1. However, such a difference can be neglected, because the two pumping devices used in the preferred embodiments of the present invention are identical and referred to respectively as the first pumping device 70 and the second pumping device 72 for ease of explanation.

Figure 5:
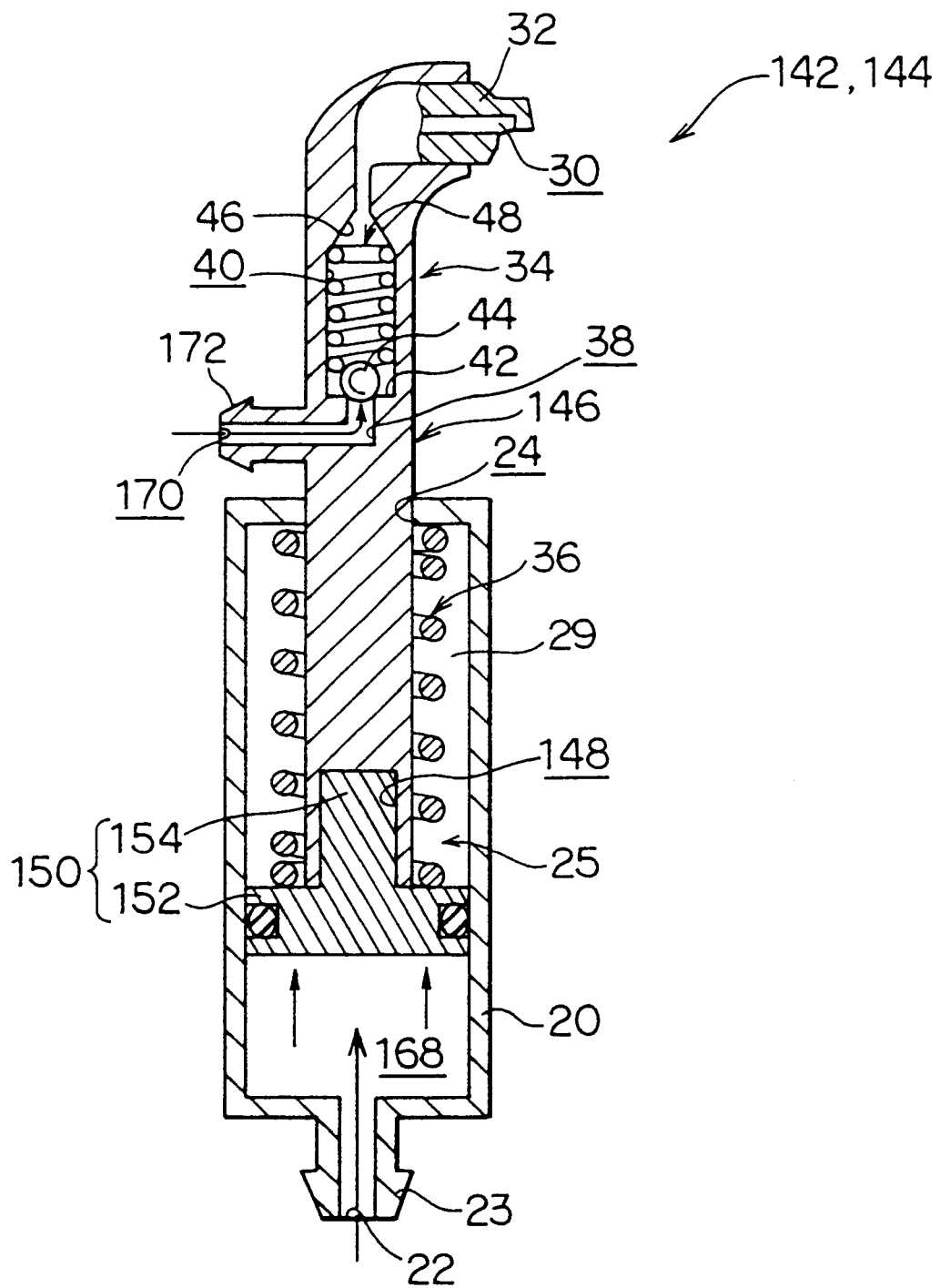
FIG. 5 is a schematic cross-sectional view showing an arrangement of first and second discharge nozzles of the washer system according to the second embodiment.

As shown in FIG. 5, each of the first discharge nozzle 142 and the second discharge nozzle 144 is a so-called telescopic type (piston and cylinder type) extendable discharge nozzle and includes a cylinder 20, which has a supply opening 22 (hose joint portion 23) and a receiving opening 24.

A part of an extendable nozzle 146, which serves as a nozzle discharge portion, is received inside of an internal chamber 25 of the cylinder 20. The extendable nozzle 146 is of a cylindrical shape having a sufficiently small outer diameter in comparison with an inner diameter of the cylinder 20. The nozzle 146 includes a nozzle tip 32, a valve chamber 40, a valve seat 42, a ball valve 44, a conical portion 46, a coil spring (valve spring) 48 and a cleaning liquid channel 38. The nozzle tip 32 includes discharge openings 30. The nozzle tip 32, the valve chamber 40, the valve seat 42, the ball valve 44, the conical portion 46, and the coil spring 48 form a discharge portion 34. Different from the first embodiment, the cleaning liquid channel 38 is not opened at the end of the extendable nozzle 146, which is opposite to the discharge portion 34 of the extendable nozzle 146, so that the cleaning liquid channel 38 is not communicated with the internal chamber 25 of the cylinder 20. Instead, the extendable nozzle 146 includes a fitting hole 148 at the end opposite to the discharge portion 34.

The extendable nozzle 146 includes a piston portion 150 at the end on the fitting hole 148 side of the extendable nozzle 146. The piston portion 150 includes a sliding portion 152 and a small diameter portion 154. The sliding portion 152 is slidably received in the internal chamber 25 of the cylinder 20. The small diameter portion 154 is fitted within the fitting hole 148. By fitting the small diameter portion 154 into the fitting hole 148, the piston portion 150 is held immovably by the extendable nozzle 146.

An intermediate portion of the extendable nozzle 146 is slidably received through the receiving opening 24 while the sliding portion 152 of the piston portion 150 is slidably received in the internal chamber 25 of the cylinder 20, and the discharge portion 34 is placed outside of the cylinder 20.

In the internal chamber 25 of the cylinder 20, the piston portion 150 defines a cleaning liquid chamber 168 on one side (lower side in FIG. 5) of the piston portion 150 and a spring chamber 29 on the other side (upper side in FIG. 5) of the piston portion 150. The cleaning liquid chamber 168 is substantially fluid-tightly separated from the spring chamber 29 by the piston portion 150. The cleaning liquid chamber 168 is communicated with the supply opening 22 to receive the cleaning liquid through the supply opening 22. A coil spring (piston spring) 36 serving as an urging means is provided in the spring chamber 29, which is defined between the inner end wall surface of the cylinder 20 located around the receiving opening 24 and the sliding portion 152. The spring 36 urges the extendable nozzle 146 toward its retracted position, at which the extendable nozzle 146 is retracted into the cylinder 20.

Also, an inlet opening 170, which is communicated with the cleaning liquid channel 38, is made in the extendable nozzle 146 at a portion, which is always disposed outside of the cylinder 20 in close proximity to the discharge portion 34. The pipe wall, which surrounds the inlet opening 170, forms a hose joint portion 172.

Consequently, the extendable nozzle 146 in each of the first discharge nozzle 142 and the second discharge nozzle 144 is extended with respect to the cylinder 20 by a hydraulic pressure of the cleaning liquid being supplied to the liquid chamber 168 from the supply opening 22, and the ball valve 44 is lifted away from the valve seat 42 against the urging force of the coil spring 48 by a hydraulic pressure of the cleaning liquid being supplied from the inlet opening 170. As a result, the cleaning liquid is discharged from the discharge openings 30. An urging force of the spring 48 is selected such that the ball valve 44 is seated against the valve seat 42 by the urging force of the spring 48 until a fluid pressure of the cleaning liquid in the cleaning liquid channel 38 exceeds the urging force of the spring 48 to allow discharge of the cleaning liquid through the discharge opening 30.

The hose joint portion 23 (supply opening 22) in each of the first discharge nozzle 142 and the second discharge nozzle 144 described above is connected to a hose joint portion 106 (second outlet opening 102) of the first pumping device 70 through a hose (or pipe) 174. Also, a hose joint portion 172 (inlet opening 170) in each of the first discharge nozzle 142 and the second discharge nozzle 144 is connected to a hose joint portion 92 (first outlet opening 88) of the second pumping device 72 through a hose (or pipe) 176.

Further, a pair of front nozzles 56 is connected to the hose joint portion 92 (first outlet opening 88) of the first pumping device 70 through a hose (or pipe) 178, and a rear nozzle 60 is connected to the hose joint portion 106 (second outlet opening 102) of the second pumping device 72 through a hose (or pipe) 180.

In other words, the first pumping device 70 is arranged in the following manner. That is, when the impeller 116 of the first pumping device 70 is rotated in the normal direction, the cleaning liquid is supplied to the front nozzles 56 through the first outlet opening 88 of the first pumping device 70 and is then discharged toward the front glass 54 through the front nozzles 56. Also, when the impeller 116 of the first pumping device 70 is rotated in the reverse direction, the cleaning liquid is supplied to the liquid chamber 168 in each of the first discharge nozzle 142 and the second discharge nozzle 144 through the second outlet opening 102 of the first pumping device 70, so that the extendable nozzle 146 is extended from the cylinder 20. Furthermore, the second pumping device 72 is arranged in the following manner. That is, when the impeller 116 of the second pumping device 72 is rotated in the normal direction, the cleaning liquid is supplied to the inlet opening 170 in each of the first discharge nozzle 142 and the second discharge nozzle 144 through the first outlet opening 88 of the second pumping device 72 and is then discharged toward the right and left headlamps 12 and 16 through the discharge openings 30 of the first discharge nozzle 142 and the second discharge nozzle 144. Also, when the impeller 116 of the second pumping device 72 is rotated in the reverse direction, the cleaning liquid is supplied to the rear nozzle 60 through the second outlet opening 102 and is then discharged toward the rear glass 58 through the rear nozzle 60.

As has been described, the cleaning liquid being supplied from the inlet opening 170 is not responsible for extending the extendable nozzle 146 from respect to the cylinder 20 against the urging force of the coil spring 36. Hence, the ball valve 44 only has to prevent leakage (so-called, running of liquid) of the cleaning liquid remaining in the hose 176 from the discharge openings 30 while the second pumping device 72 is not operating, and for this reason, the urging force of the coil spring 48 of the second embodiment is set smaller than the urging force of the coil spring 48 of the first embodiment above.

Also, the electric motor 118 in each of the first pumping device 70 and the second pumping device 72 is electrically connected to a controller 182, which serves as a discharge control apparatus. The electric motor 118 is arranged such that the electric motor 118 stops and rotates in the normal or reverse direction based on an output from the controller 182. As shown in FIG. 4, the controller 182 is electrically connected to a control switch device (or simply referred to the control switch), which includes a headlamp washing switch 122, a front glass washing switch 124 and a rear glass washing switch 126, all of which can be manipulated near the driver's seat of the vehicle.

The controller 182 is constructed in the following manner. That is, when the headlamp washing switch 122 is switched on, the controller 182 controls the electric motor 118 in the first pumping device 70 to rotate the same in the reverse direction for a predetermined time, and a little later, controls the electric motor 118 in the second pumping device 72 to rotate the same in the normal direction independently for a predetermined time either continuously or intermittently. Also, the controller 182 is constructed in the following manner. That is, when the front glass washing switch 124 is switched on, the controller 182 controls the electric motor 118 in the first pumping device 70 to rotate the same continuously in the normal direction while the ON state of the front glass washing switch 124 is maintained. Also, when the rear glass washing switch 126 is switched on, the controller 182 controls the electric motor 118 in the second pumping device 72 to rotate the same continuously in the reverse direction while the ON state of the rear glass washing switch 126 is maintained.

Also, the controller 182 is operated synchronously with a front wiper apparatus and a rear wiper apparatus. Thus, when the front glass washing switch 124 is switched on, the controller 182 activates the front wiper apparatus for a predetermined time (predetermined number of times). Also, when the rear glass washing switch 126 is switched on, the controller 182 activates the rear wiper apparatus for a predetermined time (predetermined number of times).

Next, the operation of the second embodiment will be described.

In the washer system 140, when the driver switches on the front glass washing switch 124 near the driver's seat, the controller 182 controls the electric motor 118 in the first pumping device 70 to rotate the same in the normal direction, so that the impeller 116 starts to rotate in the normal direction. Then, the cleaning liquid drawn into the impeller chamber 114 from the tank 66 through the intake opening 74 is pressurized by the impeller 116 and is discharged (pumped out) through the first outlet opening 88 of the first pumping device 70.

The cleaning liquid is guided (delivered) through the hose 178 and is supplied to each of the front nozzles 56. Thereafter, the cleaning liquid is discharged toward the front glass 54 through each of the front nozzles 56. The cleaning liquid is kept discharged while the driver keeps the front glass washing switch 124 switched on (while the ON state is maintained).

At this time, the controller 182 activates the front wiper apparatus for a predetermined time period (i.e., the corresponding wiper makes a predetermined number of swings), so that the wiper blades 130 wipe the front glass 54 as the wiper arms 128 swing. Consequently, the dirt stuck to the front glass 54 is removed together with the cleaning liquid. In short, the front glass 54 is washed.

Also, when the driver switches on the rear glass washing switch 126 near the driver's seat, the controller 182 controls the electric motor 118 in the second pumping device 72 to rotate the same in the reverse direction, so that the impeller 116 starts to rotate in the reverse direction. Then, the cleaning liquid drawn into the impeller chamber 114 from the tank 66 through the intake opening 74 is pressurized by the impeller 116 and discharged (pumped out) through the second outlet opening 102 of the second pumping device 72.

The cleaning liquid is guided through the hose 180, supplied to the rear nozzle 60 and is discharged toward the rear glass 58 through the rear nozzle 60. The cleaning liquid is kept discharged while the driver keeps the rear glass washing switch 126 switched on (while the ON state is maintained).

At this time, the controller 182 activates the rear wiper apparatus for a predetermined time period (i.e., the corresponding wiper makes a predetermined number of swings), so that the wiper blade 130 wipes the rear glass 58 as the wiper arm 128 swings. Consequently, the dirt stuck to the rear glass 58 is removed together with the cleaning liquid. In short, the rear glass 58 is washed.

Further, when the driver switches on the headlamp washing switch 122 near the driver's seat, the controller 182 controls the electric motor 118 in the first pumping device 70 to rotate the same in the reverse direction, so that the impeller 116 starts to rotate in the reverse direction. Then, the cleaning liquid drawn into the impeller chamber 114 from the tank 66 through the intake opening 74 is pressurized by the impeller 116 and is discharged (pumped out) through the second outlet opening 102 of the first pumping device 70.

The cleaning liquid is guided through the hose 174 and is supplied to the liquid chamber 168 in each of the first discharge nozzle 142 and the second discharge nozzle 144, so that the extendable nozzle 146 in each discharge nozzle 142, 144 is extended from the cylinder 20 by a hydraulic pressure of the cleaning liquid. When the discharge openings 30 located at the distal end of each extendable nozzle 146 is moved from the initial position to the discharge position, a stopper means (not shown) prevents any further extension of the extendable nozzle 146 from the cylinder 20.

When the extendable nozzle 146 reaches the discharge position (it is possible to determine whether the extendable nozzle 146 has reached the discharge position based on operation time for extending the extendable nozzle 146 or based on a signal from a limit switch or the like), the controller 182 control the electric motor 118 in the second pumping device 72 to rotate the same in the normal direction, so that the impeller 116 starts to rotate in the normal direction. Then, the cleaning liquid drawn into the impeller chamber 114 from the tank 66 through the intake opening 74 is pressurized by the impeller 116 and is discharged (pumped out) through the first outlet opening 88 of the second pumping device 72.

The cleaning liquid is then guided through the hose 176 and is supplied to the cleaning liquid channel 38 in each of the first discharge nozzle 142 and the second discharge nozzle 144 through the corresponding inlet opening 170. Then, a hydraulic pressure of the cleaning liquid forces and lifts the ball valve 44 away from the valve seat 42, so that the cleaning liquid reaches the discharge openings 30 in each of the first discharge nozzle 142 and the second discharge nozzle 144. Thereafter, the cleaning liquid is discharged toward the right headlamp 12 and the left headlamp 16 from the respective discharge openings 30 of the first discharge nozzle 142 and the second discharge nozzle 144.

The cleaning liquid is discharged only for a predetermined time period (for example, for 10 seconds after the headlamp washing switch 122 is switched on) regardless of how long the driver manipulates the headlamp washing switch 122. Also, the cleaning liquid is discharged either continuously or intermittently (consecutively) within the predetermined time.

Consequently, the dirt stuck to each of the right and left headlamps 12, 16 becomes suspended (peeled or isolated) in the cleaning liquid thus discharged and is removed by the cleaning liquid discharged subsequently. In short, the right and left headlamps 12, 16 are washed.

When the predetermined time period has elapsed, the controller 182 deactivates the first pumping device 70 and the second pumping device 72, so that the extendable nozzle 146 in each of the first discharge nozzle 142 and the second discharge nozzle 144 is returned to its initial position, at which the nozzle 146 is retracted into the cylinder 20, by the urging force of the coil spring 36 while returning the cleaning liquid remaining within the liquid chamber 168 to the tank 66 by way of the pumping apparatus 68.

The cleaning liquid is supplied to the liquid chamber 168 in each of the first discharge nozzle 142 and the second discharge nozzle 144 by the first pumping device 70. Furthermore, the cleaning liquid is supplied to the inlet opening 170 in each of the first discharge nozzle 142 and the second discharge nozzle 144 by the second pumping device 72. That is, the cleaning liquid supplied by the first pumping device 70 exerts the pressure to extend the extendable nozzle 146 from the housing 20 in each of the first discharge nozzle 142 and the second discharge nozzle 144. Furthermore, the cleaning liquid supplied by the second pumping device 72 is discharged from the discharge openings 30 in each of the first discharge nozzle 142 and the second discharge nozzle 144. Thus, it is possible to reduce a discharge rate and a discharge pressure of the cleaning liquid in each pumping device 70, 72.

In other words, the first pumping device 70 only has to supply a discharge pressure high enough to extend each extendable nozzle 146, so that it is possible to reduce the discharge pressure of the first pumping device 70. Also, the second pumping device 72 does not have to supply a discharge pressure high enough to extend each extendable nozzle 146 against the urging force of the coil spring 36 and only has to force and lift the ball valve 44 away from the valve seat 42 against the urging force of the coil spring 48. Hence, it is possible to reduce the required discharge pressure of the second pumping device 72 other than the discharge pressure required to discharge the cleaning liquid from each discharge opening 30. Further, unlike the previously proposed case where only one pumping device supplies the cleaning liquid to discharge the cleaning liquid through each discharge opening 30 while maintaining the extended state of the extendable nozzle 146 of the corresponding discharge nozzle against the urging force of the coil spring 36, each of the first pumping device 70 and the second pumping device 72 does not need to discharge the cleaning liquid through each discharge opening 30 while maintaining the extended state of the extendable nozzle 146 of the corresponding discharge nozzle against the urging force of the coil spring 36. Thus, a discharge rate per unit time can be reduced in each of the first pumping device 70 and the second pumping device 72. Consequently, it is possible to supply the first discharge nozzle 142 and the second discharge nozzle 144 with the cleaning liquid at a sufficiently high discharge pressure and also at a sufficiently large discharge rate by the compact first pumping device 70 and the second pumping device 72.

Also, the first pumping device 70 supplies the cleaning liquid to the front nozzles 56 through the first outlet opening 88, which is one of the two outlet openings of the first pumping device 70 for selectively discharging the cleaning liquid. In other words, the first pumping device 70 is made compact (i.e., the discharge rate and the discharge pressure of the first pumping device 70 is reduced). This allows the first pumping device 70 to be shared between the front nozzles 56 and the first and second discharge nozzles 142, 144 to supply the cleaning liquid to the front nozzles 56 and also to supply the cleaning liquid to the first and second discharge nozzles 142, 144 (i.e., the liquid chamber 168 of each discharge nozzle 142, 144) to extend the extendable nozzle 146 from the cylinder 20 in each discharge nozzle 142, 144. Thus, the entire size of the washer system 140 is not increased.

As has been described, in the washer system 140 according to the second embodiment, it is possible to supply the cleaning liquid to the first discharge nozzle 142 and the second discharge nozzle 144 arranged adjacent to the right headlamp 12 and the left headlamp 16, respectively, at a sufficiently high discharge pressure and also at a sufficiently high discharge rate by using the compact pumping apparatus 68 (first pumping device 70 and second pumping device 72).

Also, the second pumping device 72 supplies the rear nozzle 60 with the cleaning liquid from the second outlet opening 102, which is one of the two outlet openings of the second pumping device 72 for selectively discharging the cleaning liquid. In other words, the second pumping device 72 is made compact. This allows the second pumping device 72 to be shared between the rear nozzle 60 and the first and second discharge nozzles 142, 144 to supply the cleaning liquid to the rear nozzle 60 and also to supply the cleaning liquid to the first and second discharge nozzles 142, 144 (i.e., the inlet opening 170 of each discharge nozzle 142, 144) to discharge the cleaning liquid from the discharge openings 30 of each discharge nozzle 142, 144. Thus, it is possible to achieve the function for washing the rear glass 58 without increasing the number of the pumping devices of the pumping apparatus 68 at a low cost.

Further, each of the first pumping device 70 and the second pumping device 72 is provided with the function for selectively switching the outlet openings (first outlet opening 88 and second outlet opening 102) for discharging the cleaning liquid, that is, the destinations of cleaning liquid being supplied, depending on the rotational direction of the impeller 116. Hence, it is possible to switch the directions of discharge (destinations of the cleaning liquid being supplied) by merely changing the rotational direction of the electric motor 118 that drives the impeller 116 without requiring an extra connection between the pumping apparatus 68 and each discharge nozzle (i.e., each of the first discharge nozzle 142, the second discharge nozzle 144, the front nozzles 56 and the rear nozzle 60).

Consequently, there is the greater freedom in installation of the washer system 140 in vehicles, and the number of components can be advantageously reduced. Furthermore, since no extra connection is required, an increase in the pressure loss between the pumping apparatus 68 and each discharge nozzle (i.e., each of the first discharge nozzle 142, the second discharge nozzle 144, the front nozzles 56 and the rear nozzle 60) is advantageously avoided, and the size (discharge pressure) of the pumping apparatus 68 can be further reduced.

The cleaning liquid used for extending the extendable nozzle 146 in each of the first discharge nozzle 142 and the second discharge nozzle 144 is supplied from the first pumping device 70, and the cleaning liquid to be discharged from the discharge openings 30 in each of the first discharge nozzle 142 and the second discharge nozzle 144 is supplied from the second pumping device 72. Thus, in each discharge nozzle 142, 144, it is possible to intermittently discharge the cleaning liquid from the discharge openings 30 while maintaining the extended state of the extendable nozzle 146 with respect to the cylinder 20. As a result, it is possible to eliminate the extending movement of the extendable nozzle 146 during the interval between two consecutive intermittent discharges of the cleaning liquid from the discharge openings 30. Therefore, durability of the sliding portion (the cylinder 20, the sliding portion 152, the receiving opening 24 and the intermediate portion of the extendable nozzle 146) in each of the first discharge nozzle 142 and the second discharge nozzle 144 is increased. Furthermore, quicker response time in discharging of the cleaning liquid is achieved, thereby making it possible to shorten the time required to wash each of the headlamps 12, 16. By discharging the cleaning liquid intermittently, it is possible to, for example, wet each of the headlamps 12, 16 with a discharge of the cleaning liquid for the first time so that the dirt on each of the headlamps 12, 16 becomes suspended in the cleaning liquid in a satisfactory manner while the discharging is suspended, and then to remove the dirt suspended in this manner with a discharge of the cleaning liquid for the second time and onward. Thus, it allows effective washing with a relatively small amount of the cleaning liquid.

In the second embodiment, the second outlet opening 102 of the first pumping device 70 is connected to the liquid chamber 168 in each of the first discharge nozzle 142 and the second discharge nozzle 144 for supplying the cleaning liquid, and the first outlet opening 88 of the second pumping device 72 is connected to the inlet opening 170 in each of the first discharge nozzle 142 and the second discharge nozzle 144 for supplying the cleaning liquid. It should be appreciated, however, that the present invention is not limited to the foregoing arrangement, and each of the first pumping device 70 and the second pumping device 72 only has to be connected to either of each inlet opening 170 and each liquid chamber 168 for supplying the cleaning liquid. Hence, for example, the second outlet opening 102 of the second pumping device 72 may be connected to each liquid chamber 168, and the first outlet opening 88 of the first pumping device 70 may be connected to each inlet opening 170.

Also, in the second embodiment, the first pumping device 70 and the second pumping device 72 are basically of the same arrangement. It should be appreciated, however, that the present invention is not limited to the foregoing arrangement. For example, the performance of the first pumping device 70 and the performance of the second pumping device 72 may differ from each other, as required.

Next, a washer system 200 for a vehicle according to a third embodiment of the present invention will be described with reference to FIG. 6. Like components are labeled with like reference numerals with respect to the first and second embodiments above, and the description of these components is not repeated.

Figure 6:
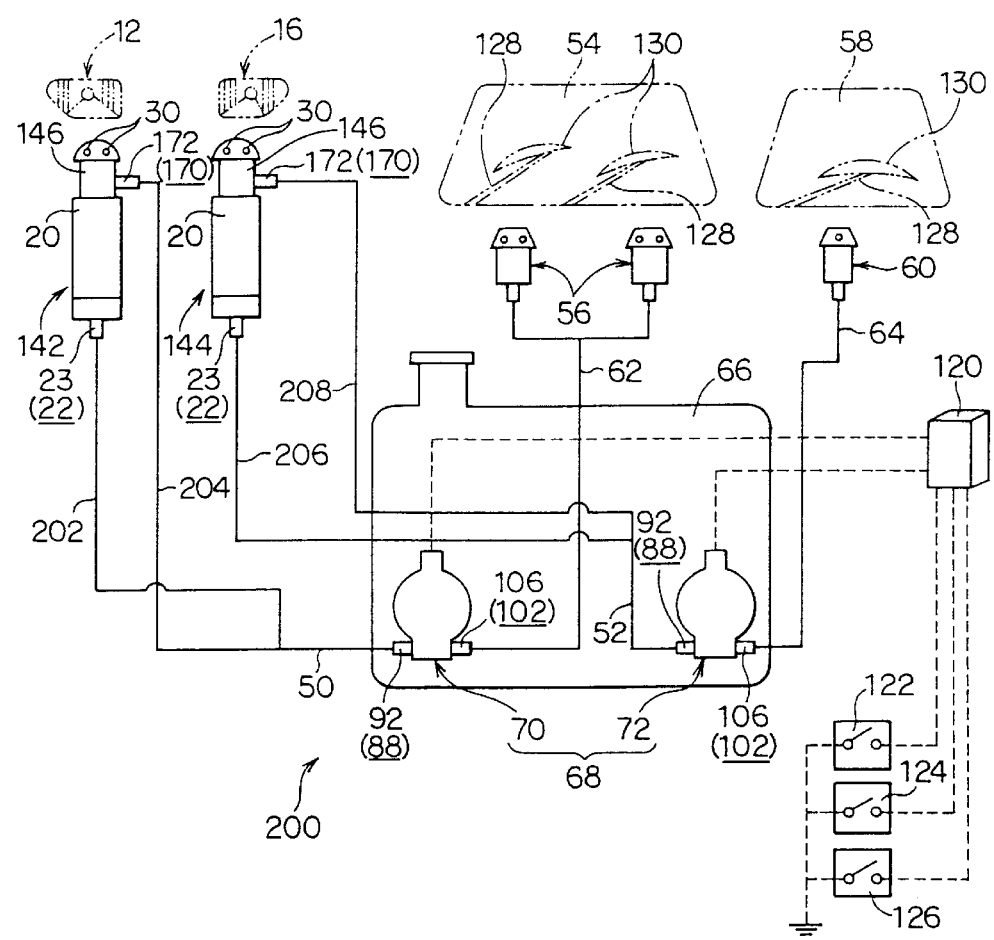
FIG. 6 is a schematic view showing an arrangement of a washer system for a vehicle according to a third embodiment of the present invention.

With reference to FIG. 6, the washer system 200 is different from the washer system 10 of the first embodiment and is identical with the washer system 140 of the second embodiment in that the first discharge nozzle 14 and the second discharge nozzle 18 are replaced with the first discharge nozzle 142 and the second discharge nozzle 144, respectively.

Also, the washer system 200 is identical with the washer system 10 of the first embodiment and is different from the washer system 140 of the second embodiment in that the first discharge nozzle 142 is supplied with the cleaning liquid by the first pumping device 70 alone, and the second discharge nozzle 144 is supplied with the cleaning liquid by the second pumping device 72 alone.

To be more specific, a hose (or pipe) 50 connected to a hose joint portion 92 (first outlet opening 88) of the first pumping device 70 is branched to hoses 202, 204, and the hose 202 is connected to a hose joint portion 23 (supply opening 22) of the first discharge nozzle 142 while the hose 204 is connected to a hose joint portion 172 (inlet opening 170) of the first discharge nozzle 142.

Also, a hose (or pipe) 52 connected to a hose joint portion 92 (first outlet opening 88) of the second pumping device 72 is branched to hoses 206, 208, and the hose 206 is connected to a hose joint portion 23 (supply opening 22) of the second discharge nozzle 144 while the hose 208 is connected to a hose joint portion 172 (inlet opening 170) of the second discharge nozzle 144.

In other words, the first pumping device 70 is arranged in the following manner. That is, when the impeller 116 of the first pumping device 70 is rotated in the normal direction, the cleaning liquid is supplied to the liquid chamber 168 and the inlet opening 170 of the first discharge nozzle 142 from the first outlet opening 88 of the first pumping device 70. Thus, in the first discharge nozzle 142, the extendable nozzle 146 is extended with respect to the cylinder 20, and the cleaning liquid is discharged toward the right headlamp 12 from the discharge openings 30 of the extendable nozzle 146 thus extended. Also, the first pumping device 70 is arranged in the following manner. That is, when the impeller 116 of the first pumping device 70 is rotated in the reverse direction, the cleaning liquid is supplied to the front nozzles 56 from the second outlet opening 102 of the first pumping device 70 and is discharged toward the front glass 54 from the front nozzles 56.

The second pumping device 72 is arranged in the following manner. That is, when the impeller 116 of the second pumping device 72 is rotated in the normal direction, the cleaning liquid is supplied to the liquid chamber 168 and the inlet opening 170 of the second discharge nozzle 144 from the first outlet opening 88 of the second pumping device 72. Thus, in the second discharge nozzle 144, the extendable nozzle 146 is extended with respect to the cylinder 20, and the cleaning liquid is discharged toward the left headlamp 16 from the discharge openings 30 of the extendable nozzle 146 thus extended. Also, the second pumping device 72 is arranged in the following manner. That is, when the impeller 116 of the second pumping device 72 is rotated in the reverse direction, the cleaning liquid is supplied to the rear nozzle 60 from the second outlet opening 102 of the second pumping device 72 and is discharged toward the rear glass 58 from the rear nozzle 60.

In this manner, similar to the first discharge nozzle 14 and the second discharge nozzle 18, the first discharge nozzle 142 and the second discharge nozzle 144 need to prevent the cleaning liquid from being discharged before their respective extendable nozzles 146 are extended and reach the discharge positions. For this reason, an urging force of a coil spring 48 of the third embodiment is set as strong as the urging force of the coil spring 48 of the first embodiment (stronger than the urging force of the coil spring 48 of the second embodiment).

Next, the operation of the third embodiment will be described. However, since the function for washing the front glass 54 and the rear glass 58 is identical with that of the first embodiment, the description of this function is omitted herein. Also, the function of the pumping apparatus 68 (first pumping device 70 and second pumping device 72) is omitted herein.

In the washer system 200, when the driver switches on he headlamp washing switch 122 near the driver's seat, the controller 120 controls the electric motor 118 in each of the first pumping device 70 and the second pumping device 72 to rotate the same in the normal direction, so that the cleaning liquid in the tank 66 is discharged (pumped out) through the first outlet opening 88 in each of the first pumping device 70 and the second pumping device 72.

The cleaning liquid discharged from the first outlet opening 88 of the first pumping device 70 is guided through the hoses 50, 202 and is supplied to the liquid chamber 168 from the supply opening 22 of the first discharge nozzle 142. On the other hand, the cleaning liquid discharged from the first outlet opening 88 of the second pumping device 72 is guided through the hoses 52, 206 and is supplied to the liquid chamber 168 from the supply opening 22 of the second discharge nozzle 144.

At this time, in each of the first discharge nozzle 142 and the second discharge nozzle 144, the cleaning liquid remains up to the very upstream of the ball valve 44, and for this reason, the cleaning liquid in the hoses 204, 208 hardly flows.

In each of the first discharge nozzle 142 and the second discharge nozzle 144 having the cleaning liquid being supplied to their respective liquid chambers 168, the piston portion 150 is forced to slide by a hydraulic pressure of the cleaning liquid against an urging force of the coil spring 36, so that the extendable nozzle 146 is extended with respect to the cylinder 20. When the discharge openings 30 located at the distal end of each extendable nozzle 146 is moved from the initial position to the discharge position, a stopper means (not shown) prevents any further extension of the extendable nozzle 146 from the cylinder 20.

When the hydraulic pressure of the cleaning liquid in each of the hoses 204, 208 rises further as the first pumping device 70 and the second pumping device 72 continue to operate in this state, the ball valve 44 is lifted away from the valve seat 42 by the hydraulic pressure against an urging force of the coil spring 48. Then, the inlet opening 170 in each of the first discharge nozzle 142 and the second discharge nozzle 144 communicates with the discharge openings 30 through the cleaning liquid channel 38 and the valve chamber 40, so that the cleaning liquid supplied to the inlet opening 170 through the corresponding hose 204, 208 is discharged from each discharge opening 30.

At this time, since the stopper means limits the movements of the piston portion 150 of the extendable nozzle 146 that defines one end of the liquid camber 168, the cleaning liquid in each of the hoses 202, 206, which are communicated with the liquid chambers 168 in the first discharge nozzle 142 and the second discharge nozzle 144, respectively, hardly flows.

Then, the cleaning liquid is discharged toward the right headlamp 12 from the discharge openings 30 of the first discharge nozzle 142, and the cleaning liquid is discharged toward the left headlamp 16 from the discharge openings 30 of the second discharge nozzle 144. The cleaning liquid is discharged from the discharge openings 30 of each of the first and second discharge nozzles 142, 144 concurrently only for a predetermined time (for example, for 10 seconds after the headlamp washing switch 122 is switched on) regardless of how long the driver manipulates the headlamp washing switch 122. Also, the cleaning liquid is discharged either continuously or intermittently (consecutively) within the predetermined time.

Consequently, the dirt stuck to each of the right and left headlamps 12, 16 becomes suspended (peeled or isolated) in the cleaning liquid thus discharged and is removed by the cleaning liquid discharged subsequently. In short, the right and left headlamps 12, 16 are washed.

When the predetermined time has passed, the controller 120 deactivates the first pumping device 70 and the second pumping device 72, so that the extendable nozzle 146 in each of the first discharge nozzle 142 and the second discharge nozzle 144 is returned to its initial position, at which the nozzle 146 is retracted into the cylinder 20, by the urging force of the coil spring 36 while returning the cleaning liquid remaining in each liquid chamber 168 to the tank 66 by way of the pumping apparatus 68.

The first discharge nozzle 142 is supplied with the cleaning liquid by the first pumping device 70 and the second discharge nozzle 144 is supplied with the cleaning liquid by the second pumping device 72. That is, one pumping device (the first pumping device 70 or the second pumping device 72) is used for one discharge nozzle (first discharge nozzle 142 or the second discharge nozzle 144). Thus, a discharge rate of the cleaning liquid from each pumping device can be reduced. Hence, it is possible to supply the first discharge nozzle 142 and the second discharge nozzle 144 with the cleaning liquid at a sufficiently high discharge pressure and at a sufficiently high discharge rate by the compact first pumping device 70 and second pumping device 72.

Also, the first pumping device 70 supplies the front nozzles 56 with the cleaning liquid from the second outlet opening 102, which is one of the two outlet openings for selectively discharging the cleaning liquid. In other words, the front nozzles 56 and the first discharge nozzle 142 can share the first pumping device 70 because the first pumping device 70 is reduced in size (a reduction of a discharge rate), which makes it possible to prevent the overall washer system 200 from being increased in size.

As has been described, with the washer system 200 according to the third embodiment, it is possible to supply the first discharge nozzle 142 and the second discharge nozzle 144 provided to the vehicle on the right and left to correspond to the headlamps 12 and 16 mounted on the right and left of the vehicle with the cleaning liquid at a sufficiently high discharge pressure and also at a sufficiently high discharge rate by using the compact pumping apparatus 68 (first pumping device 70 and second pumping device 72).

In particular, since each of the first pumping device 70 and the second pumping device 72, which respectively supply the first discharge nozzle 142 and the second discharge nozzle 144 of the extendable discharge nozzle type with the cleaning liquid, is responsible for extending the extendable nozzle 146 with respect to the cylinder 20 against the urging force of the coil spring 36 before the cleaning liquid is discharged from the discharge openings 30 (the valve lifting pressure (discharge pressure) of the ball valve 44 has to be set high enough to prevent the cleaning liquid from being discharged before the extendable nozzle 146 is extended to its full extent), a discharge pressure of each of the first pumping device 70 and the second pumping device 72 is relatively high. However, because one pumping device is used for one discharge nozzle as described above, it is possible to supply the first discharge nozzle 142 and the second discharge nozzle 144 with the cleaning liquid at a sufficiently high discharge pressure and also at a sufficiently high discharge rate by the compact pumping apparatus 68 (first pumping device 70 and second pumping device 72).

Also, each of the first discharge nozzle 142 and the second discharge nozzle 144 includes the ball valve 44 to achieve the function for extending the extendable nozzle 146, and the cleaning liquid remains up to the very upstream of the ball valve 44 even when the pumping apparatus 68 is at rest. Thus, as soon as the headlamp washing switch 122 is switched on, the extendable nozzle 146 is extended promptly and starts to discharge the cleaning liquid. Furthermore, undesirable leakage (running of liquid) of the remaining cleaning liquid from the discharge openings 30 can be prevented.

Also, the second pumping device 72 supplies the cleaning liquid to the rear nozzle 60 from the second outlet opening 102, which is one of the two outlet openings for selectively discharging the cleaning liquid. In other words, the rear nozzle 60 and the second discharge nozzle 144 can share the second pumping device 72 because the second pumping device 72 is reduced in size, which makes it possible to provide the function for washing the rear glass 58 without increasing the number of the pumping devices forming the pumping apparatus 68 at a low cost.

Further, each of the first pumping device 70 and the second pumping device 72 is provided with the function for selectively switching the outlet openings (first outlet opening 88 and second outlet opening 102) for discharging the cleaning liquid, that is, the destinations of cleaning liquid being supplied, depending on the rotational direction of the impeller 116. Hence, it is possible to switch the directions of discharge (destinations of the cleaning liquid being supplied) selectively by merely changing the rotational direction of the electric motor 118 that drives the impeller 116 without requiring an extra connection between the pumping apparatus 68 and each discharge nozzle (each of the first discharge nozzle 142, the second discharge nozzle 144, the front nozzles 56 and the rear nozzle 60).

Consequently, there is the greater freedom in installation of the washer system 200 in vehicles, and the number of the components can be advantageously reduced. Also, since no extra connection is required, it is possible to further reduce the size of the pumping apparatus 68 (to further reduce a discharge pressure of each pumping device) without increasing losses in pressure between the pumping apparatus 68 and each discharge nozzle (i.e., each of the first discharge nozzle 142, the second discharge nozzle 144, the front nozzles 56 and the rear nozzle 60).

Also, in the first discharge nozzle 142, the cleaning liquid is supplied to the liquid chamber 168 and the inlet opening 170 through the hoses 202, 204, which are branched from the hose 50. Hence, once the extendable nozzle 146 is extended to its full extent, the extendable nozzle 146 is kept extended by a high static pressure applied to the branched portion (around the first outlet opening 88 of the first pumping device 70), and the whole cleaning liquid pumped (discharged) by the first pumping device 70 is supplied to the inlet opening 170. This is also true for the second discharge nozzle 144.

Thus, in the washer system 200, the first pumping device 70 and the second pumping device 72, each of which has a lower discharge pressure in comparison to that of the washer system 10 of the first embodiment, can be used. Furthermore, the amount or flow of the cleaning liquid, which is discharged toward the right and left headlamps 12, 16, can be increased in comparison to that of the washer system 140 of the second embodiment above.

In other words, when the first pumping device 70 and the second pumping device 72, each of which has the performance similar to that of the washer system 10, are used, the amount or flow of the cleaning liquid, which is discharged toward the right and left headlamps 12, 16, can be increased in comparison to the washer system 10. Furthermore, when the amount or flow of the cleaning liquid is the same as that of the washer system 140, a discharge rate of at least the second pumping device 72 can be reduced.

It is preferred that the hose 50 is branched to the hoses 202, 204 in the vicinity of the first outlet opening 88 of the first pumping device 70, so that the extendable nozzle 146 can be kept extended at a high static pressure of the cleaning liquid. For the same reason, it is also preferred that the hose 52 is branched to the hoses 206, 208 in the vicinity of the first outlet opening 88 of the second pumping device 72.

Further, according to the third embodiment, the first outlet opening 88 of the first pumping device 70 is connected to the first discharge nozzle 142 for supplying the cleaning liquid, and the first outlet opening 88 of the second pumping device 72 is connected to the second discharge nozzle 144 for supplying the cleaning liquid. It should be appreciated, however, that the present invention is not limited to the foregoing arrangement, and each of the first pumping device 70 and the second pumping device 72 only has to be connected to either of the first discharge nozzle 142 and the second discharge nozzle 144 for supplying the cleaning liquid. Hence, for example, the second outlet opening 102 of the second pumping device 72 may be connected to the first discharge nozzle 142 while the first outlet opening 88 of the first pumping device 70 is connected to the second discharge nozzle 144.

In the first through third embodiments, the washer systems 10, 140, 200 are arranged in a preferred manner so that each includes the rear nozzle 60 connected to the second pumping device 72 for supplying the cleaning liquid. It should appreciated, however, that the present invention is not limited to the foregoing arrangement, and for example, the washer systems 10, 140, 200 may omit the rear nozzle 60 or the rear nozzle 60 may be connected to a third pumping device for supplying the cleaning liquid. In these cases, it is sufficient that the second pumping device 72 has only one outlet opening for discharging the cleaning liquid, and the electric motor 118 (impeller 116) of the second pumping device 72 rotates only in one direction. In other words, the second pumping device 72 no longer needs the valve apparatus composed of the first valve 96 and other components for switching the directions of discharge of the cleaning liquid, and it may be arranged in such a manner that the intake opening 74 and a single outlet opening communicate with the impeller chamber 114 directly and independently.

Also, in the first through third embodiments, the first pumping device 70 and the second pumping device 72 are arranged in a preferred manner that each switches the destinations of the cleaning liquid being supplied depending on the rotational direction of their respective electric motors 118 (impellers 116). It should be appreciated, however, that the present invention is not limited to the foregoing arrangement, and for example, it may be arranged in such a manner that an electromagnetic switching valve controlled by the controller 120 or 182 is attached to a single outlet opening made in each of the first pumping device 70 and the second pumping device 72.

Further, in the first through third embodiments above, each of the first discharge nozzle 14, 142 and the second discharge nozzles 18, 144 includes the cylinder 20, which serves as the nozzle base, and the extendable nozzle 26, 146, which serves as the nozzle discharge portion. It should be appreciated, however, that the present invention is not limited to the foregoing arrangement, and it is sufficient to arrange the first discharge nozzle 14 or the like to be extended by a hydraulic pressure of the cleaning liquid. Hence, for example, the first discharge nozzle 14 or the like may be arranged so as to include a piston portion, which serves as the nozzle base, and a movable cylinder, which serves as the nozzle discharge portion.

Additional advantages and modifications will readily occur to those skilled in the art. The invention in its broader terms is therefore, not limited to the specific details, representative apparatus, and illustrative examples shown and described.

What is claimed is:

1. A washer system comprising:
    a tank for storing cleaning liquid;
    a first discharge nozzle, which receives the cleaning liquid from the tank and discharges the cleaning liquid to a right headlamp of a vehicle;

a second discharge nozzle, which receives the cleaning liquid from the tank and discharges the cleaning liquid to a left headlamp of the vehicle;

a front nozzle, which receives the cleaning liquid from the tank and discharges the cleaning liquid to a front glass of the vehicle; and a pumping apparatus, which is connected to the tank, the first discharge nozzle, the second discharge nozzle and the front nozzle and pumps the cleaning liquid of the tank to the first discharge nozzle, the second discharge nozzle and the front nozzle, wherein the pumping apparatus includes:

a first pumping device, which includes two outlet openings and selectively discharges the cleaning liquid through a corresponding one of the two outlet openings that is selected depending on an operational state of the first pumping device, wherein one of the two outlet openings of the first pumping device is connected to one of the first and second discharge nozzles to supply the cleaning liquid to the one of the first and second discharge nozzles, and the other one of the two outlet openings of the first pumping device is connected to the front nozzle to supply the cleaning liquid to the front nozzle; and a second pumping device, which includes at least one outlet opening for discharging the cleaning liquid from the second pumping device, wherein one of the at least one outlet opening is connected to the other one of the first and second discharge nozzles to supply the cleaning liquid to the other one of the first and second discharge nozzles.

2. A washer system according to claim 1, wherein:

each of the first and second discharge nozzles includes:

a nozzle base, which is secured to the vehicle;

a nozzle discharge portion, which discharges the cleaning liquid to the corresponding one of the right and left headlamps and is slidable relative to the nozzle base between a retracted position and a discharge position; and an urging means for urging the nozzle discharge portion toward the retracted position;

the nozzle discharge portion is moved relative to the nozzle base from the retracted position to the discharge position by a fluid pressure of the cleaning liquid supplied from the pumping apparatus and discharges the cleaning liquid to the corresponding one of the right and left headlamps; and the nozzle discharge portion is moved relative to the nozzle base from the discharge position to the retracted position by an urging force of the urging means upon completion of the discharge of the cleaning liquid to the corresponding one of the right and left headlamps.

3. A washer system according to claim 2, wherein:

the nozzle base of each of the first and second discharge nozzles includes:

an internal chamber;

a receiving opening, which receives a portion of the nozzle discharge portion therethrough and is communicated with one end of the internal chamber; and a supply opening, which is communicated with the other end of the internal chamber to supply the cleaning liquid from the pumping apparatus to the other end of the internal chamber; and the nozzle discharge portion of each of the first and second discharge nozzles includes:

a piston portion, which is slidably received in the internal chamber of the nozzle base and defines a cleaning liquid chamber on one side of the piston portion and a spring chamber on the other side of the piston portion;

an inlet opening, which is formed in the piston portion and opens to the cleaning liquid chamber;

a discharge opening, which discharges the cleaning liquid to the corresponding one of the right and left headlamps;

a cleaning liquid channel, which communicates between the inlet opening and the discharge opening in the nozzle discharge portion;

a valve seat, which is formed in the cleaning liquid channel;

a ball valve, which is arranged in the cleaning liquid channel and normally seats against the valve seat to close the cleaning liquid channel; and a valve spring, which is arranged in the cleaning liquid channel and urges the ball valve against the valve seat;

the cleaning liquid chamber is arranged at the other end of the internal chamber in communication with the supply opening and is substantially fluid-tightly separated from the spring chamber by the piston portion;

the urging means is a piston spring, which is received in the spring chamber and urges the piston portion in a direction away from the receiving opening of the nozzle base; and the piston portion is moved against an urging force of the piston spring when a fluid pressure of the cleaning liquid supplied to the cleaning liquid chamber through the supply opening of the nozzle base exceeds the urging force of the piston spring.

4. A washer system according to claim 3, wherein an urging force of the valve spring is selected such that the ball valve is seated against the valve seat by the urging force of the valve spring until the nozzle discharge portion reaches the discharge position, at which the ball valve is lifted away from the valve seat by a fluid pressure of the cleaning liquid in the cleaning liquid channel to allow discharge of the cleaning liquid through the discharge opening.

5. A washer system according to claim 1, further comprising a rear nozzle, which is connected to the pumping apparatus to receive the cleaning liquid from the pumping apparatus and discharges the cleaning liquid to a rear glass of the vehicle, wherein:

the at least one outlet opening of the second pumping device includes two outlet openings;

one of the two outlet openings of the second pumping device is the one connected to the other one of the first and second discharge nozzles; and the other one of the two outlet openings of the second pumping device is connected to the rear nozzle to supply the cleaning liquid to the rear nozzle.

6. A washer system according to claim 1, wherein:

the first pumping device further includes:

an electric motor, which is rotatable in both normal and reverse directions;

an impeller, which is rotated by the electric motor in both the normal and reverse directions;

an intake opening, which is connected to the tank to receive the cleaning liquid from the tank; and a valve apparatus, which is connected to the intake opening and the two outlet openings in the first pumping device;

the valve apparatus allows fluid communication between the intake opening and the one of the two outlet openings in the first pumping device and restrains fluid communication between the intake opening and the other one of the two outlet openings when the valve apparatus is operated by a fluid pressure of the cleaning liquid that is exerted upon rotation of the impeller in the normal direction; and the valve apparatus restrains the fluid communication between the intake opening and the one of the two outlet openings in the first pumping device and allows the fluid communication between the intake opening and the other one of the two outlet openings when the valve apparatus is operated by a fluid pressure of the cleaning liquid that is exerted upon rotation of the impeller in the reverse direction.

7. A washer system according to claim 5, wherein:

at least one of the first and second pumping devices includes:
- an electric motor, which is rotatable in both normal and reverse directions;
- an impeller, which is rotated by the electric motor in both the normal and reverse directions;
- an intake opening, which is connected to the tank to receive the cleaning liquid from the tank; and
- a valve apparatus, which is connected to the intake opening and the two outlet openings in the corresponding pumping device;

the valve apparatus allows fluid communication between the intake opening and the one of the two outlet openings in the corresponding pumping device and restrains fluid communication between the intake opening and the other one of the two outlet openings when the valve apparatus is operated by a fluid pressure of the cleaning liquid that is exerted upon rotation of the impeller in the normal direction; and the valve apparatus restrains the fluid communication between the intake opening and the one of the two outlet openings in the corresponding pumping device and allows the fluid communication between the intake opening and the other one of the two outlet openings when the valve apparatus is operated by a fluid pressure of the cleaning liquid that is exerted upon rotation of the impeller in the reverse direction.

8. A washer system according to claim 1, further comprising a control switch for selecting a washing mode of the washer system from a plurality of predetermined washing modes, which include a front glass washing mode and a headlamp washing mode, wherein when the headlamp washing mode is selected through the control switch, the first pumping device and the second pumping device are simultaneously operated such that the first discharge nozzle and the second discharge nozzle discharge the cleaning liquid to the right headlamp and the left headlamp, respectively.

9. A washer system according to claim 1, wherein the first pumping device and the second pumping device are both directly secured to and connected to the same tank.

10. A washer system according to claim 1, wherein:

each of the first and second discharge nozzles includes a nozzle base, a nozzle discharge portion and a piston spring;

the nozzle base includes:
an internal chamber;
a receiving opening, which receives a portion of the nozzle discharge portion therethrough and is communicated with one end of the internal chamber; and
a supply opening, which is communicated with the other end of the internal chamber to supply the cleaning liquid from the pumping apparatus to the other end of the internal chamber; and the nozzle discharge portion includes:
- a piston portion, which is slidably received in the internal chamber of the nozzle base and defines the cleaning liquid chamber on one side of the piston portion and a spring chamber on the other side of the piston portion, wherein the cleaning liquid chamber is arranged at the other end of the internal chamber in communication with the supply opening and is substantially fluid-tightly separated from the spring chamber by the piston portion;
- an inlet opening, which is formed in the nozzle discharge portion at outside of the nozzle base to receive the cleaning liquid supplied from the pumping apparatus;
- a discharge opening, which discharges the cleaning liquid to the corresponding one of the right and left headlamps;
- a cleaning liquid channel, which communicates between the inlet opening and the discharge opening in the nozzle discharge portion;
- a valve seat, which is formed in the cleaning liquid channel;
- a ball valve, which is arranged in the cleaning liquid channel and normally seats against the valve seat to close the cleaning liquid channel; and
- a valve spring, which is arranged in the cleaning liquid channel and urges the ball valve against the valve seat;

an urging force of the valve spring is selected such that the ball valve is seated against the valve seat by the urging force of the valve spring until a fluid pressure of the cleaning liquid in the cleaning liquid channel exceeds the urging force of the valve spring to allow discharge of the cleaning liquid through the discharge opening;

the piston spring is received in the spring chamber and urges the piston portion of the nozzle discharge portion in a direction away from the receiving opening of the nozzle base;

the piston portion is moved against an urging force of the piston spring when a fluid pressure of the cleaning liquid supplied to the cleaning liquid chamber through the supply opening of the nozzle base exceeds the urging force of the piston spring;

the one of the two outlet openings of the first pumping device is connected to both the supply opening and the inlet opening of the one of the first and second discharge nozzles; and the one of the at least one outlet opening of the second pumping device is connected to both the supply opening and the inlet opening of the other one of the first and second discharge nozzles.

* * * * *